United States Patent [19]

Gabriel

[11] 3,996,457

[45] Dec. 7, 1976

[54] ELECTRONIC ANALOG COMPUTERS

[76] Inventor: Edwin Z. Gabriel, 318-B South St., Eatontown, N.J. 07724

[22] Filed: Nov. 20, 1974

[21] Appl. No.: 525,511

[52] U.S. Cl. .............................. 235/184; 35/19 A; 35/30; 235/193

[51] Int. Cl.² ..................... G06G 7/06; G06G 7/48; G09B 23/02

[58] Field of Search .......... 235/184, 193, 185, 180; 35/10, 13, 19 A, 30

[56] References Cited

UNITED STATES PATENTS

| | | | |
|---|---|---|---|
| 3,278,736 | 10/1966 | Pastoriza | 235/184 |
| 3,309,793 | 3/1967 | Bartee | 35/10 |
| 3,540,135 | 11/1970 | Alcosser et al. | 35/19 A |
| 3,587,055 | 6/1971 | Gilbert | 235/184 X |
| 3,728,534 | 4/1973 | Bertram et al. | 235/184 |

*Primary Examiner*—Joseph F. Ruggiero

[57] ABSTRACT

A compact, self-contained, light-weight, easily programmable, desk-top analog computer, capable of being perpetually updated as new components and improved circuits are available. Unlike other such computers, the program panel is a combination patching, switching and electronic module board and includes all of the coefficient-setting potentiometers, voltmeters, function and mode control switches, and spare terminal strips for additional passive and active analog and digital logic circuits. Because of its small size and low cost, it could be more readily used as an aid to motivate high school and college students to study high mathematics, physics, electronics and automatic control systems. Unlike the pocket-sized digital computers, this computer provides both transient and steady-state solutions to differential equations which can be observed on an oscilloscope or graphically plotted on an x-y recorder receiving signals from computer modules. The reduction in size and weight is accomplished with the aid of integrated linear and nonlinear circuits and other subminiature components. Thus, the analog computing circuits for integrating, summing, differentiation, limiting, multiplication and division are simplified. Simplification in programming a differential equation and/or implementation by direct simulation from a functional block diagram is accomplished through a novel arrangement of parts, components, switches, jacks and diagrams to enable even the beginner to make interconnections rapidly and without the confusion sometimes associated with other analog and hybrid computers. Amplifiers may be zeroed for null voltage offset as on other analog computers. The mode controls include reset, hold, and compute as on other analog computers. Opportunity exists for introducing passive compensation or filter circuits for enhancing the stability of a control system more quickly and without tying up any operational amplifiers. This is not easily done on other analog computers. To further expedite implementing a problem on the computer panel, the user has a choice between using patch cords, toggle switches or a combination of the two, a feature not found on other analog computers. A feature worthy of merit is that none of the components need be soldered. Therefore, each is easily replaceable by others. In addition, the final preferred embodiment has been so designed that even a blind person can program a problem easily by feel. Because of the combination of visual and audio sound effects, solutions to differential equations will have added meaning to the student in mathematics, electronics and physics, contributing to his retention of objectives and purposes of the study.

16 Claims, 62 Drawing Figures

FET-INPUT OPERATIONAL

INTEGRATED CIRCUIT IN TO-5 CAN

SWITCH 41 LOCATED EXTERIOR TO COMPUTER MODULE

INPUT
OUTPUT
OUT

COMPUTER MODULE
INPUT
OUTPUT
RELAY
INITIAL CONDITION INPUT (OP) E2
(RESET) E2
I.COND.
G OUT

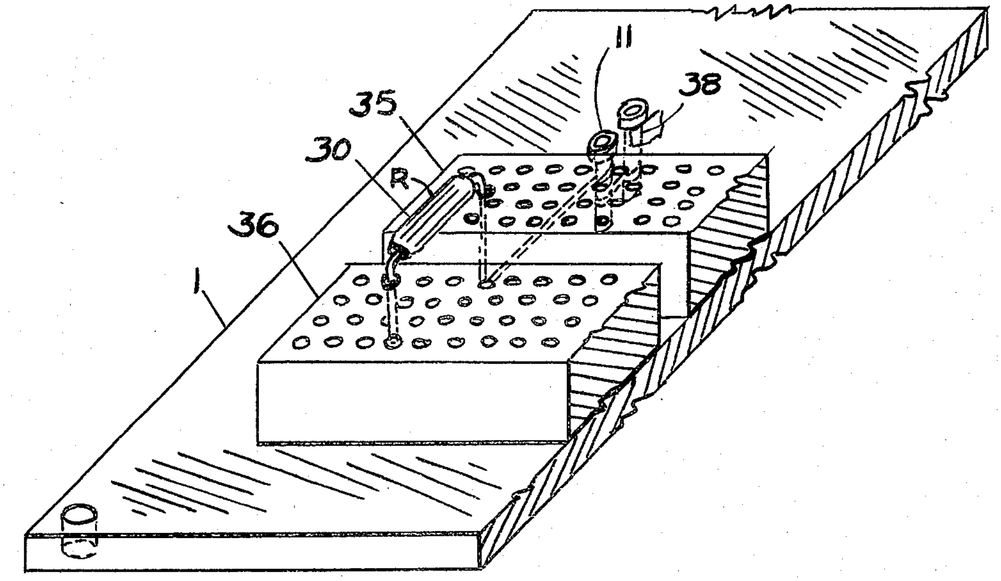
FIG. 9
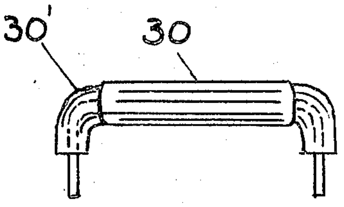
FIG. 9B
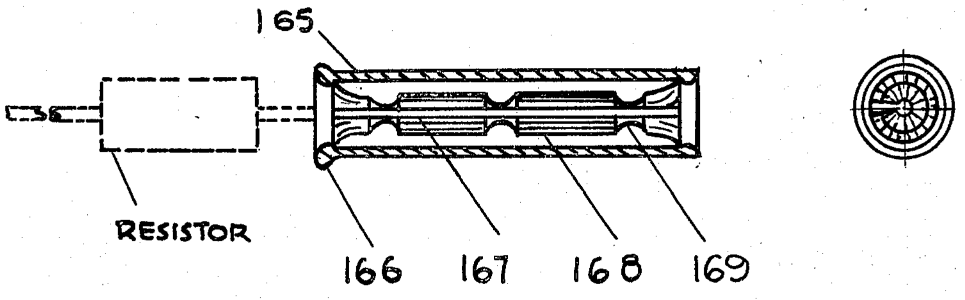
FIG. 9C
FIG. 9D

SPST SWITCH

DIVIDE CIRCUIT

| FROM | TO |
|---|---|
| AMP. OUT | AMP. IN |
| 1A | 2A |
| 2A | 3A |
| 3A | 4A |
| 4A | 5A |
| 5A | 6A |
| 6A | 7A |
| 7A | 8A |
| 8A | 9A |
| POT. OUT | AMP. IN |
| 3A' | 1A |
| 5A' | 3A |
| 7A' | 5A |
| POT. OUT | AMP. IN |
| 1A' | 1A |
| 2A' | 2A |
| 3A' | 3A |
| 4A' | 4A |
| 5A' | 5A |
| 6A' | 6A |
| 7A' | 7A |
| 8A' | 8A |
| POT. OUT | AMP. IN |
| 4A' | 2A |
| 6A' | 4A |
| 8A' | 6A |

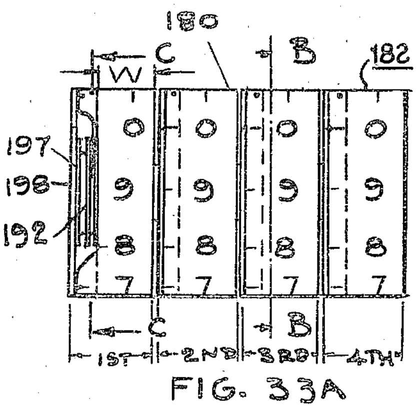
FIG. 33A
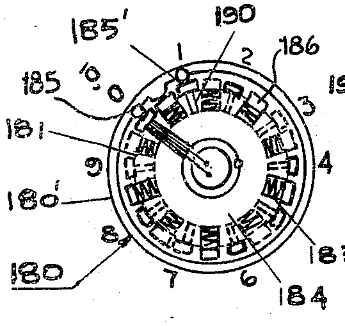
FIG. 33B
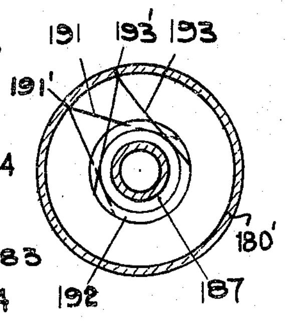
FIG. 33C
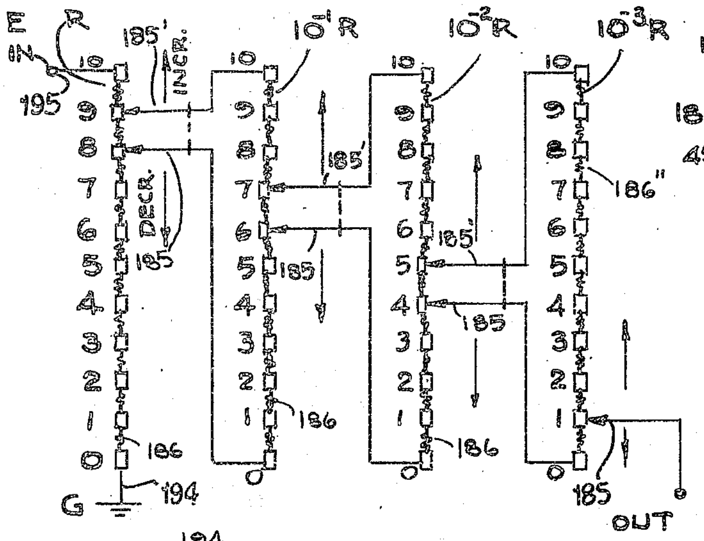
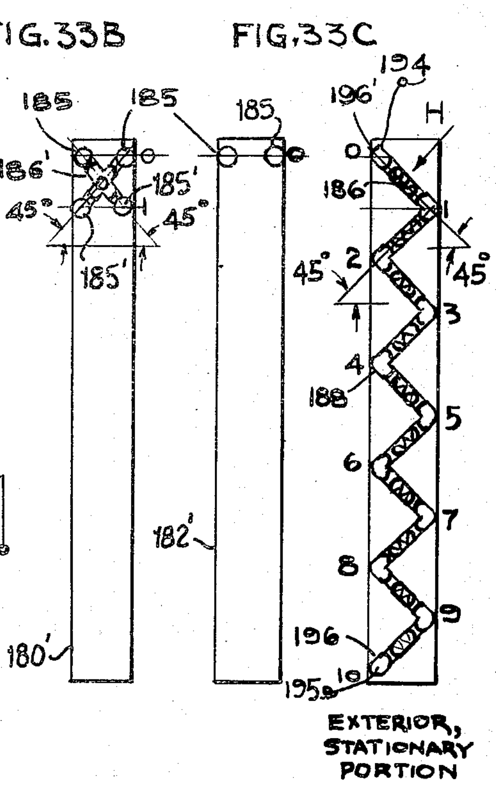
FIG. 33D FIG. 33E FIG. 33F
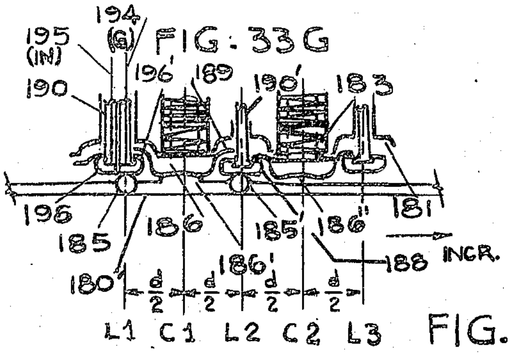
FIG. 33G
FIG. 33H
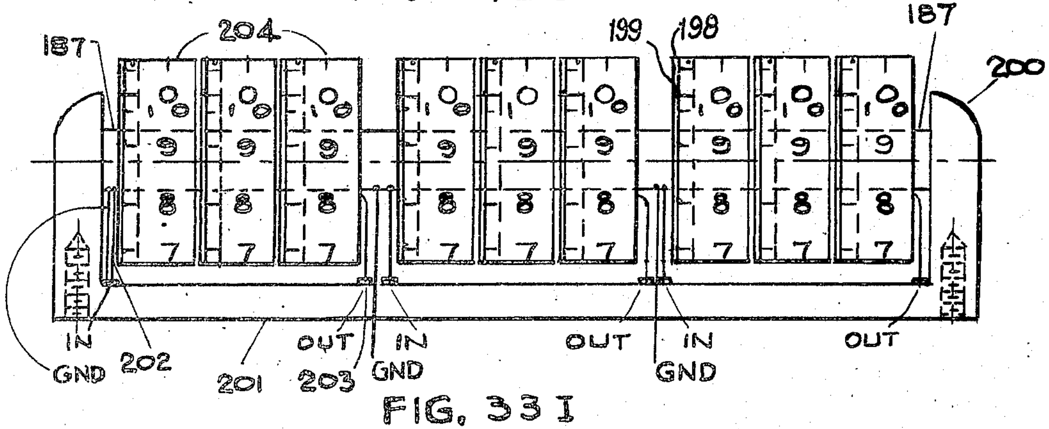
FIG. 33 I

ELECTRONIC ANALOG COMPUTERS

BACKGROUND

The present invention relates generally to educational portable electronic analog computers. Existing analog computers have soldered components and components which are usually not visible to the user. In such cases when soldered components are used the number and gains of inputs to amplifiers and integrators are fixed. Their number of outputs are fixed too. Their circuits within a module cannot be modified, updated, or repaired easily and components cannot be replaced readily. As a result, the amplifiers, multiplier/dividers, integrators, inverters, square root operators and comparators can only be treated as "black boxes". Hence, to perform the operation of a transfer function representing a filter, as an example, two or more amplifiers ordinarily are needed. Using the present invention, usually but one amplifier would be required, making for a more compact system and cutting down on costs and space. In addition, as an educational computer, it enables integration of teaching of electronic circuit design and computer programming in one neat package. Digital logic circuits may be added as needed to simulate a needed physical system or solve a desired differential equation. This is known as hybrid computation, when some operations are performed in an analog manner and others in a digital manner to enable a complete system to be simulated.

Another desirable feature is that an analog computing component may be removed in toto with the terminal strips and replaced by another computing component with its terminal strips, since there need not be any soldered connections. In addition, a pluggable computing component which itself can be modified to suit the programmer is a capability which does not exist in today's analog computers to my knowledge. Comparable analog computers weigh between fifty to one hundred pounds and are too large for a person, such as a teacher, to carry from room to room to give demonstrations and the like. The present invention would not weigh more than ten pounds and would be the size of a large book, which can be placed inside an attache or a brief case.

Should a mathematician or student wish to consider the computing modules or components to be "black boxes", identified covers are provided which enclose the circuits, eliminating their visibility, thereby not distracting a person whose only interest is programming an equation or set of equations. In such a case, suggested standard circuits would be referred to by the programmer. The covers can show the programmer's symbols, to indicate the type of circuit wired beneath.

In the present invention the patch panel, electronic circuits and manifold supplying voltages to the operational amplifiers and other components such as relays, potentiometers, transistors, logic computing components, if any, are integrated on one common panel. The panel configuration is designed to facilitate easy building and experimenting with a wide variety of circuit structures and circuits involving one or more amplifiers. The density of amplifiers per square foot of area is higher than in other computers. For example, in the present invention there are provisions for at least 12 amplifiers per square foot of panel area and the same panel includes all the electronic circuits, potentiometers, switches and voltmeters. The voltmeters may give either analog or digital indication of the voltage value, depending on the cost of the computer and the amount the user is willing to spend for the convenience of digital indication.

SUMMARY OF THE INVENTION

In accomplishing the foregoing and related objects, the invention relates to improvements in analog computers to enable ease in programming by a student or teacher involved in higher mathematics, physics, electronics and controls and regulating systems. The performance of a system is simulated by a model composed of integrated-circuit and subminiature discrete circuit components and into which the operational data are fed in the form of electrical voltages or currents in order to produce an electric output whose behavior is indicative of the system performance being investigated. An integrated circuit in a standard TO-5 can, dual-in-line package or other form of package contains many transistor and passive components interconnected to perform as an operational amplifier or logical computing function, thus enabling a reduction in the computer size. Other latest state-of-the-art hardware has been utilized to make the circuits compact and as accessible as possible to the electronic engineer or technician. Because resistors, capacitors and other discrete and integrated circuit components are easily removable and replaceable by others, they may be any quality and accuracy desired commensurate with the computational accuracy requirements, thus saving appreciable cost when used for many educational purposes.

The dc. amplifiers which can be connected to function either as adders or as integrators have been provided with attenuators, such as ten-turn potentiometers, to extend their range of usefulness when implementing a differential equation. In order to adapt this analog computer for general purpose application in solving a wide variety of problems, other computational components such as multipliers, dividers and the like to operate in conjunction with the amplifiers have been provided. To expedite implementing a mathematical problem, switches are provided to make connections between amplifiers in cascade and to make feedback connections from the output of one amplifier to the input of another via a potentiometer. It is assumed that integrated-circuits, such as amplifiers, have output current overload protection and input clamps to protect circuits from high input voltages. For additional protection diode clamps have been suggested. Other circuits for overload protection and protection from power-supply voltages, protection from excessive voltages that may be connected to their output terminals may be found in many recent text-books on applications of operational amplifiers and an analog integrated circuit design. For larger, more complex mathematical problems, requiring more than 11 or 12 computing components, several such computers may be assembled together and so wired that a single operating mode control switch on one computer can operate as many computing components as desired simultaneously. The power supplies would be connected in parallel.

To take advantage of additional senses, such as hearing as well as sight, in order to make a greater impression on a student studying control systems, for example, a miniature speaker can be connected to the output stage of a 1 or 2 watt I.c. operational amplifier designed to accept the input impedance of the selected speaker. The output signal of a control system would be applied to this operational amplifier having appropriate input and feedback resistors to provide the desired gain. The student now listens to the oscillations converted to sound in addition to seeing them on the scope. He now can visualize better how it would feel sitting in an automobile whose spring suspension system oscillated in this manner, as a typical application of combining audio with visual.

BRIEF DESCRIPTION OF THE DRAWINGS

For the purpose of illustrating the invention, there are shown in the drawings forms thereof which are presently preferred. It is to be understood, however, that this invention is not necessarily limited to the precise arrangement, instrumentalities and field of utility as therein demonstrated.

FIG. 9 including FIGS. 9A, 9B, 9C and 9D is a perspective view showing input resistor R and its method of connection to a jack.

FIG. 9B shows a resistor with wire ends bent and stiffened with plastic. FIGS. 9C and D show a connector having a jack at each end. FIGS. 33A to 33I illustrate a cascaded incremental displacement potentiometer.

DESCRIPTION OF THE PREFERRED EMBODIMENTS

Figure 1:
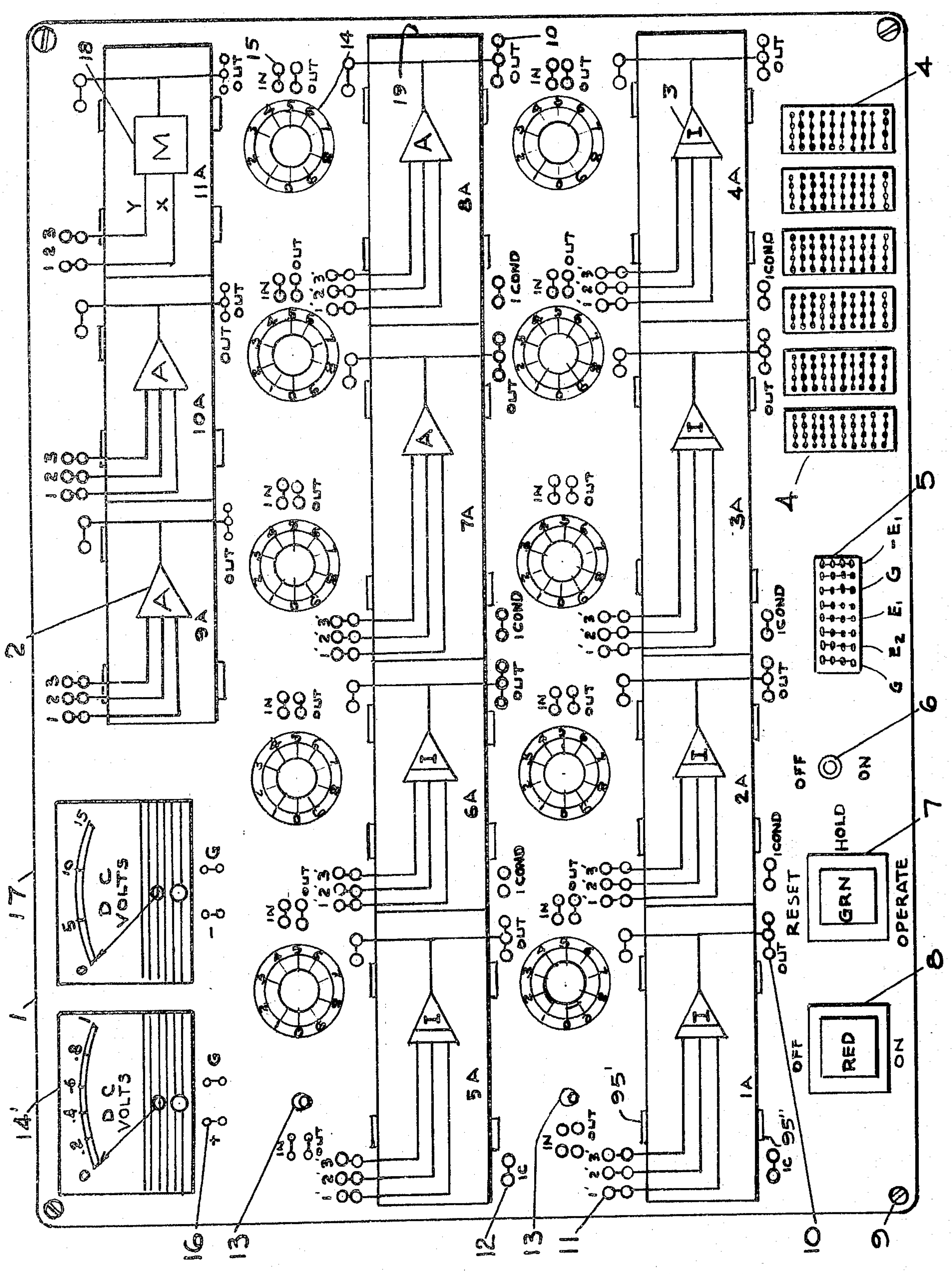
FIG. 1 is a top view of the analog computer patching panel, including voltmeters, programmer's diagrams of amplifiers, integrators and multiplier, potentiometer dials, switches, bare terminals strips and supply voltage strip.

Referring to the accompanying drawings, FIG. 1 illustrates a typical plan view of an educational lightweight analog computer about the size of the telephone directory or slightly larger. Panel 1 is a combination patch and electronic module board. Shown are symbolic diagrams of four amplifiers 2, six integrators 3, 10 10-turn potentiometers and dials 14 and one multiplier 8. Also are shown six terminal strips 4 for assembly of discrete components, such as resistors, capacitors, diodes, transistors and logic computing components. Terminal strips 4 contain imbedded spring clip points similar to FIG. 6, but without metal studs 32. Ten such quad spring clips are indicated on each of the six strips. Small circles 10, 11, 12, 15 and 16 indicate jacks for interconnecting components with patch cords. Switches 13 enable step voltages to be introduced, as desired, to computing components or to perform other manual switching operations. Terminal block 5 has supply voltages available for external application to amplifiers and other components via potentiometers 14. An external precision reference potentiometer may be used for accurately positioning potentiometers. Switch 8 is a type three-pole, single throw (3PST) for applying the required supply voltages to amplifiers, multiplier, relays and logic computing components, if any, on panel 1. Switch 7 is a momentary "on"-"off"-momentary on, single pole, double throw illuminated rocker switch. This switch applies excitation voltage to the "reset" and "operate" relays of integrators, in accordance with FIG. 13. Switch 8 is a red-colored illuminated rocker switch. It lights up when in the on position. Voltmeters 14' and 17 are for measuring the input and output voltages, respectively, of amplifiers. Although analog voltmeters are shown, they may be replaced by a single digital multi-range voltmeter capable of accepting analog signals in the same space occupied by the voltmeters. Cover 19 extends the entire length of the panel and contains program block diagrams of the circuits beneath.

Figure 2:
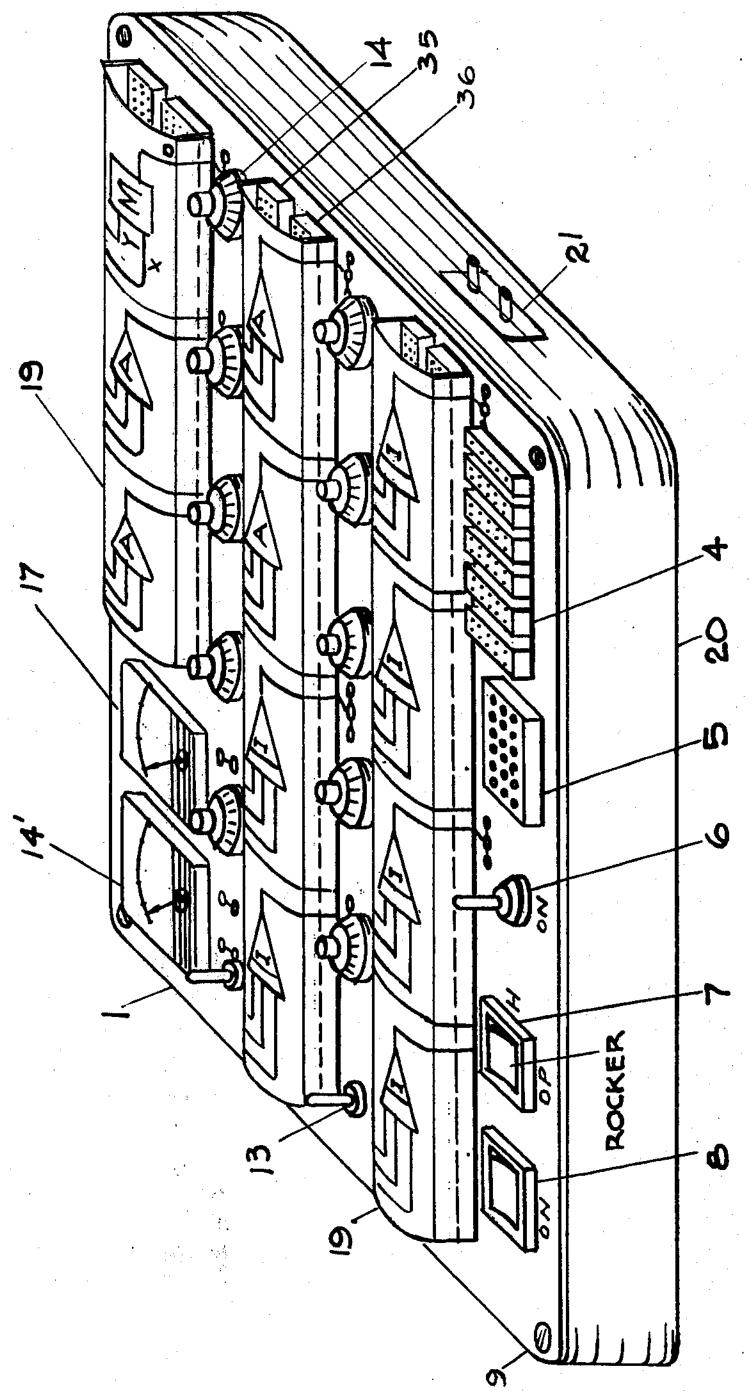
FIG. 2 is a perspective view of the entire analog computer including its cabinet, and showing removable covers over prewired terminal strips. The power supplies for supplying the various voltages to the computer circuits are located within the cabinet.

FIG. 2 illustrates a three dimensional view of the analog computer showing panel 1, voltmeters 14' and 17, diagrammed covers 19, potentiometer 10-turn dials 14, toggle switches 13, three pole illuminated rocker switches 7 and 8, cabinet 20, pronged male plug 21 to enable use of an electrical cord which can be disconnected. Panel 1 is held onto cabinet 20 by four screws 24. Within cabinet 20 are the power supplies for applying voltages to the operational amplifiers and the integrator relays. A four-wire electrical cord between switch 8 and power supply terminals is sufficiently long to permit removal of the panel. Terminal strips 4 may be used for compensation networks and logic computing components. Cabinet 10 may be reinforced inside with ribbing for greater strength.

Figures 3, 4, 5, 6, 6A, 6B, 7A, 7B, 8A, 8B:
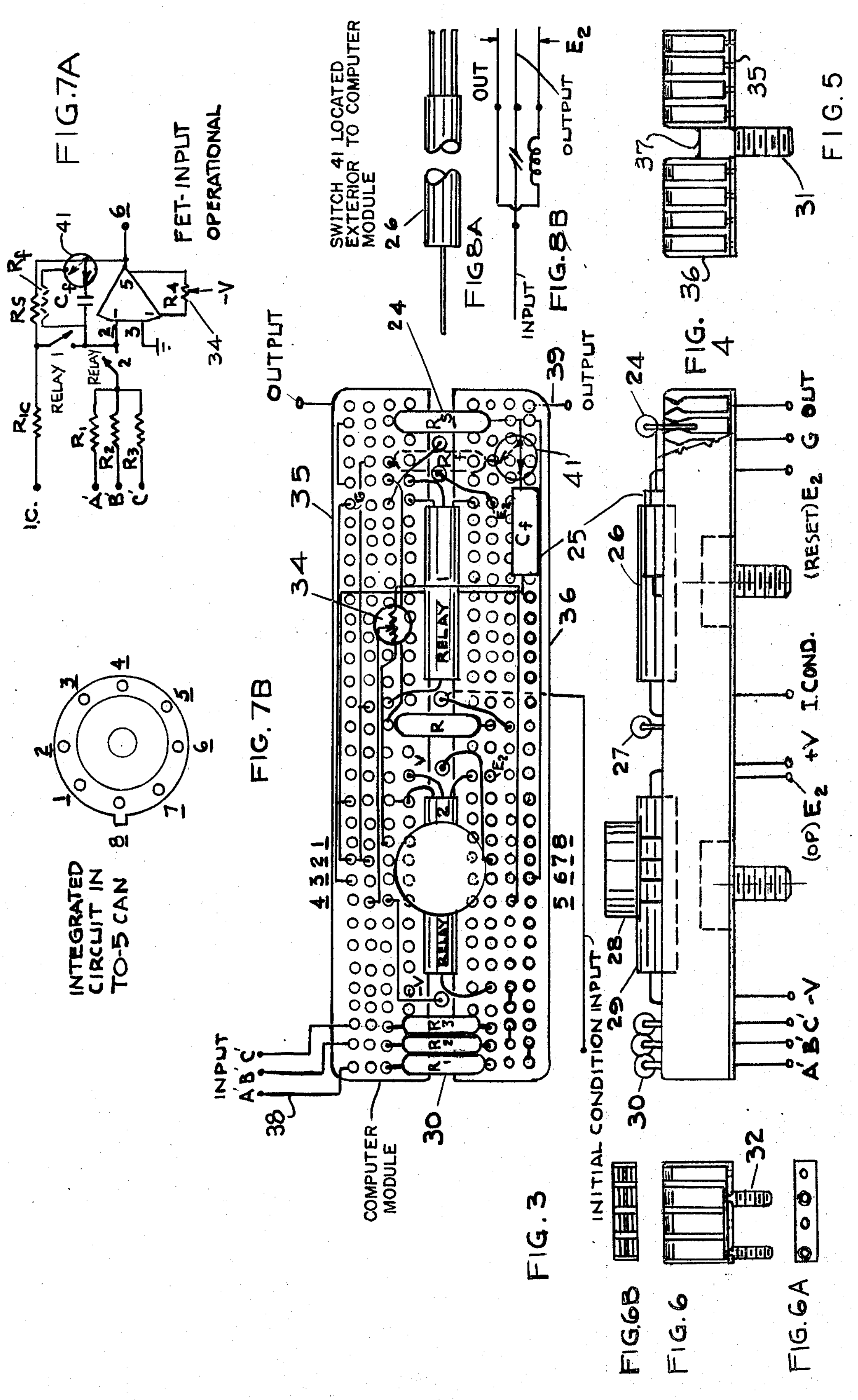
FIG. 3 is a plan view of the joined terminal strips containing the circuits for a summing analog integrator, including initial conditions input.
FIG. 4 is a side view of the terminal strip showing the two threaded support posts.
FIG. 5 is an end view of the terminal strip showing eight spring clips for solderless wiring of components. The clips are encapsulated with transparent or translucent plastic and thus are at least partially visible.
FIG. 6 is a side view of the metal four-clip terminal strip with two metal, threaded studs mounted underneath the terminal strips of FIG. 3.
FIG. 6A is the bottom view of FIG. 6.
FIG. 6B is its top view. Centers of spring points may be spaced the standard 0.1 inch apart.
FIG. 7A is a circuit diagram of the interconnected components mounted on the terminal strips shown in FIG. 3.
FIG. 7B is the bottom view of the integrated circuit amplifier in a TO-5 can configuration showing the eight terminals.
FIG. 8A is a physical embodiment of a reed type relay diagram.
FIG. 8B is its circuit diagram.

FIG. 3 shows a plan view of two terminal strips 35 and 36 molded or cemented together with spacers 37 which may include studs 31. It is shown double size. The assembly contains the components of a summing integrator circuit, including input resistors R1, R2 and R3, input relay 29, initial condition input resistor 27, shunt resistor 24, reset relay 26, feedback capacitor 25, FET-input operational amplifier 28 and trimmer potentiometer 34, interconnected by conducting wires in accordance with FIG. 7A. Although three input resistors are shown, five or more can be used, if desired, to enable a greater variety of amplifier gains and introduction of more input signals. Relay 29 may be moved to the right in FIG. 3 to enable installation of the additional resistors. The circuit input wires 38 are soldered or wire-wrapped to jacks 11 inserted into panel 1 and are then thrust or inserted into appropriate openings under terminal strip 35, as shown in FIG. 9. This also is done in the case of the integrator circuit output wire 39. Wire 39 has one end inserted under terminal strip 36 into the hole shown and the other end soldered to underside of output jack 10, FIG. 1. FIG. 8A shows one physical embodiment of a reed type miniature relay 26 or 29. FIG. 8B is its equivalent circuit diagram. Excitation voltage $E_2$ is applied across its outside terminals, as shown to close the relay. FIG. 4 is a side view of terminal strips 35 and 36 showing the components mounted thereon. All of the signal input wires 38, applied voltages $+V$, $-V$ and $E_2$, IC, input 40, ground G and output wire 39 enter terminal strips 35 and 36 from underneath. FIG. 5 is an end view of terminal strips 35 and 36 showing spacer 37 and attached threaded stud 31. Since the metal clips are imbedded or encapsulated in either clear or translucent plastic, they are at least visible. Each gang of four clips are joined together at the bottom as a single continuous piece and holes in the plastic are provided both underneath the terminal as well as on top for insertion of the conducting wire. Holes also exist at the bottom of the metal to enable the hole to be continuous. FIG. 6 is an end view of the bare metal terminal clips. If metal studs are used, then plastic studs 31 are unnecessary. There would be two or four metal studs 32 to each terminal strip 35 to enable its secure attachment to a mounting panel. FIG. 7A represents a computer circuit symbol or diagram of the integrator and FIG. 7B is a bottom view of the FET-input operational amplifier identifying pin locations. FIG. 8A is a physical diagram of one type of reed relay and FIG. 8B is its schematic. This particular miniature reed relay is manufactured by Wheelock Signals, Inc., Long Branch, New Jersey. FIG. 9 is a three-dimensional view showing input resistor $R_1$ and how it is connected to jack 11 underneath panel 1 via the hole through clip strip 30. Six of these integrator terminal strips are shown in FIG. 1.

Figure 11B:
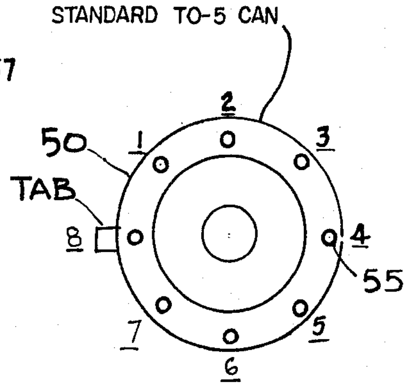
FIG. 11B is a bottom view of the integrated circuit amplifier in a standard TO-5 can configuration, showing eight terminals.
Figure 11A:
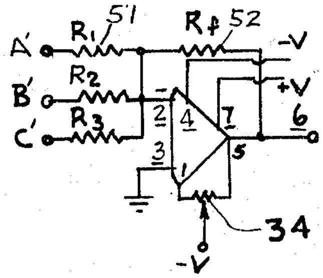
FIG. 11A is a circuit diagram of the interconnected components mounted on the joined terminal strips.
Figure 10A:
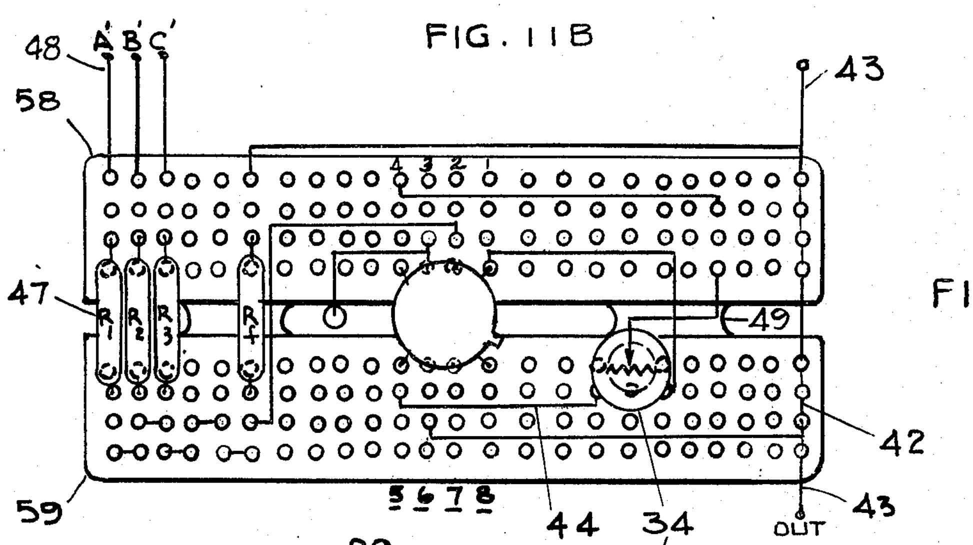
FIG. 10A shows a plan view of two joined terminal strips containing the circuit components for an inverting summing amplifier.
Figure 10B:
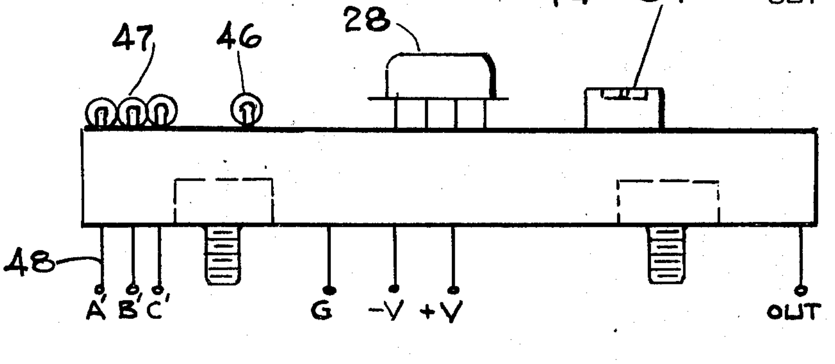
FIG. 10B is a side view of FIG. 10A showing two threaded mounting studs and the integrated circuit amplifier and other surface-mounted discrete components.
Figure 10C:
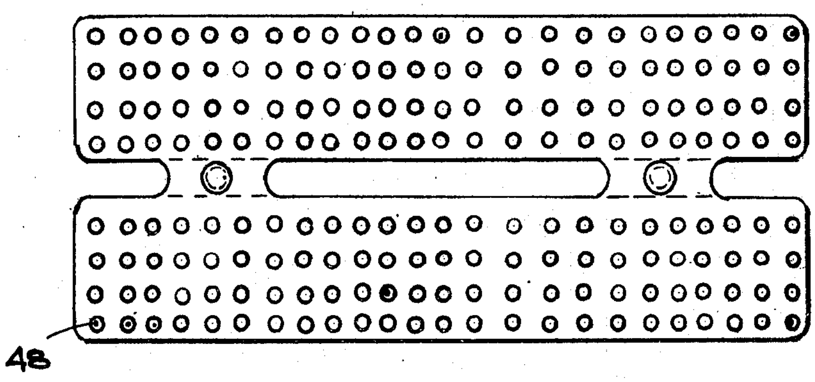
FIG. 10C is the bottom view of FIG. 10A showing holes or openings for insertion of solid conductors extending from top to the bottom of the said terminal strip.
Figure 10D:
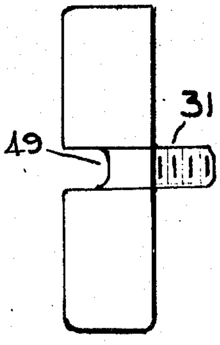
FIG. 10D is an end view showing the threaded mounting stud, attached to or being an integral part of the spacer joining the two terminal strips.
Figure 13:
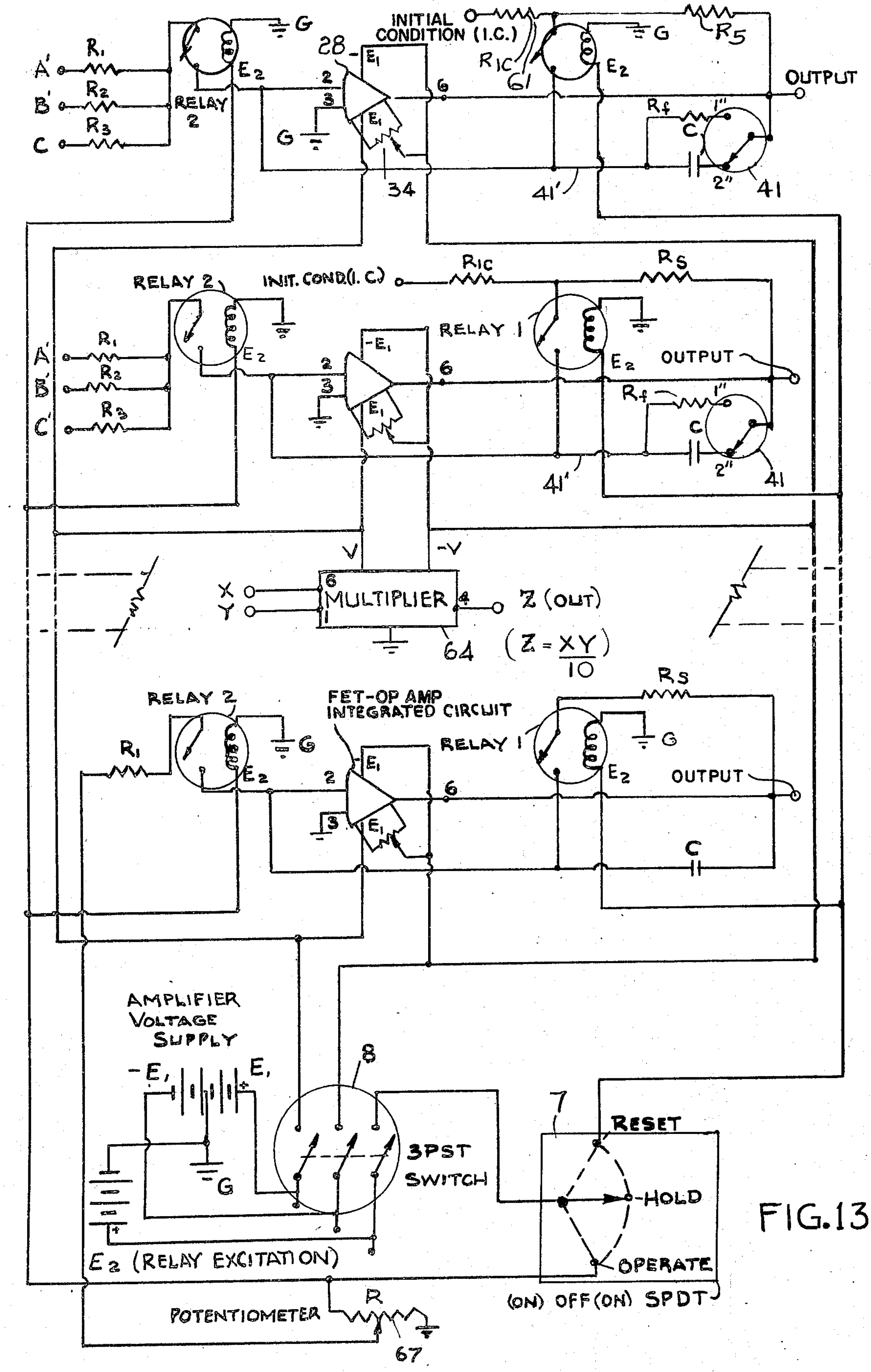
FIG. 13 is a circuit diagram of a portion of the analog computer system showing the manifold wiring to typical integrator operational amplifiers, a multiplier and two rocker type switches. It is possible to have a single bipolar voltage supply excite or power both the relays and the integrated circuits, instead of the two shown.
Figure 30B:
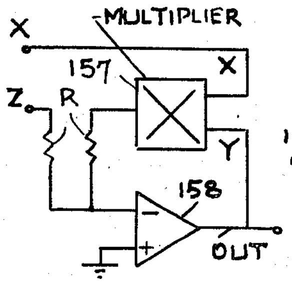
FIG. 30B illustrates a division circuit in which a multiplier is shown in the feedback loop of an operational amplifier.

FIG. 10A is a plan view of two terminals molded or joined together with cement by spacers 49 for assembly of summing amplifier components, shown in FIG. 11A. These terminal strips are not required to be as long as FIG. 3 strips since fewer components are mounted thereon. It is shown approximately double size for clarity of showing the parts. Low impedance guard rings may encircle input terminals of integrated circuit (IC) amplifier and tied to ground to absorb any stray voltage leakages. The components include input resistors $R_1$, $R_2$, $R_3$, feedback resistor $R_f$, operational amplifier 54 and trimmer potentiometer 34, interconnected by insulated copper wires in accordance with FIG. 11A. Although three input resistors are shown, five or more may be used, if desired, to enable a greater variety of amplifier gains and introduction of more input signals. Resistor 46 may be moved to the right to allow space for insertion of the additional resistors. One end of circuit input wires 48 shown in FIGS. 10A and 10B are soldered to the underneath portion of jacks 11 inserted into panel 1 and the other ends are then inserted into appropriate openings, containing the spring clips, under terminal strip 58, as shown in FIG. 9. Output wire 43 is similarly connected to jack 10. Each amplifier 28 with null offset connections can be balanced for zero voltage offset by adjustment of the trimmer potentiometer screw 43. Color-coded wire may be used to denote various voltages, ground, input and output of computing component. Discrete components are interconnected with No. 22 to No. 26 gauge solid wire 44, FIG. 10A; and each set of four tie points are connected inside each strip, indicated by interconnections 42, FIG. 10A. FIG. 13 represents a circuit diagram of a portion of the analog computer circuitry showing the manifold and other wiring to typical operational amplifiers and an integrated circuit multiplier. The top two integrators are typical of all but one and are capable of being converted to summing amplifiers by manually positioning SPDT switch 41 from position 2" to position 1". The interior circuit diagram of multiplier 64 is shown in FIG. 30B, and the multiplier is commercially available packaged in a TO-5 can. The plus and minus supply voltages to operational amplifiers 28 and to multiplier 64 would be the same in value, typically ±15 volts. When implementing a simulated differential equation on the computer, output responses are applied either to an oscilloscope or to an oscillographic recorder. The bottom integrator circuit is shown in order to provide a signal for the oscilloscope horizontal axis so that a time-response can be seen on its CRT screen when the output of another computing module is applied to its vertical axis. The magnitude of the voltage signal from potentiometer 67 controls the rate at which the response signal travels across the screen and this rate is scaled in accordance with requirements.

The 3PST switch 8 is for applying power to the operational amplifiers and relays when closed. ON-off-on switch 7 controls power to relays 1 and 2. When switch 7 is in RESET position, relays 1 are closed; in "HOLD" position all relays are open; and in OPERATE position only relays 2 are closed.

Figure 12:
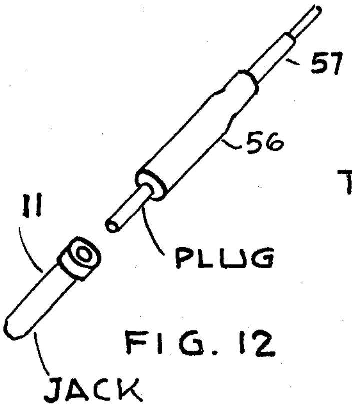
FIG. 12 shows a banana plug assembled to a patch cord wire and the jack into which it is to be inserted.

Capacity of analog computer may be increased by ganging two or more of the computer cabinets together, including ganging single pole double thrown Reset, Hold and operate switch 7 so that all such switches operate simultaneously and in unison. FIG. 12 illustrates the banana plug, its attachment to a conducting wire and the jack into which it is inserted for completing a connection. FIG. 13 shows wiring from control switches 7 and 8 to the integrator 3 and multiplier 18 computing modules, FIG. 1.

Figure 14:
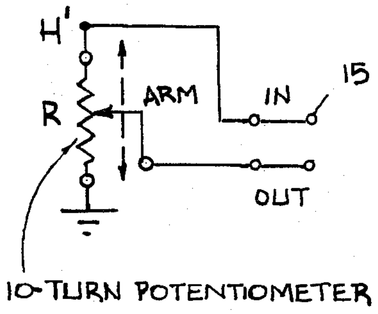
FIG. 14 shows the 10-turn potentiometer circuit.
Figure 15:
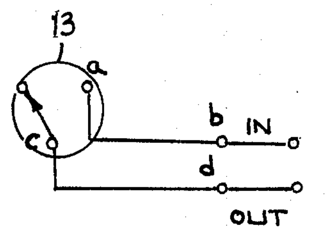
FIG. 15 shows the single pole, single throw (SPST) switch circuit.
Figure 16:
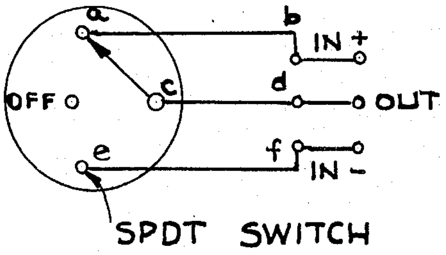
FIG. 16 shows the single pole, double throw (SPDT) switch circuit.

FIG. 14 is a 10-Turn potentiometer circuit, in which the ground terminal might be prewired by soldering to a common ground terminal and wires from the high side H' of the potentiometer are soldered to jacks 15, marked "IN" and its arm soldered to jacks marked "OUT". Thus, any potentiometer may be used with any amplifier for attentuating the signal in any decimal or fractional amount from zero (0) to one (1). Ten such potentiometer circuits are required in accordance with FIG. 1. FIG. 15 shows a single-pole, single-throw switch (SPST) 13. One such switch is shown on panel 1, FIG. 1. This switch may be used either to introduce a unipolar signal to an operational amplifier or to add or disconnect a network from a circuit. Wires from points *a* to *b* and points *c* to *d* are soldered to terminals underneath panel 1 or they may be inserted in jack-to-jack connectors, shown in FIG. 9C. Toggle of switch 6 and flush-mounted jacks are exposed on panel 1 so that all patching to the switch is done from the panel 1 surface. Two function switches 13, located at the left side of panel 1, each of which have wiring diagrams as shown in FIG. 16. Wires from points *a* to *b*, *c* to *d*, *e* to *f* are soldered to terminals on Switch 13 and to body of jacks under panel 1 or they may be inserted in jack-to-jack connectors. These switches 13 are single-pole, double throw (SPDT) switches with a center off position. Their purpose is to introduce either a step input voltage or some other function into an amplifier circuit. Positive voltages are applied at point *b* and negative voltages at point *f*. Point *d* is the output.

Figure 18:
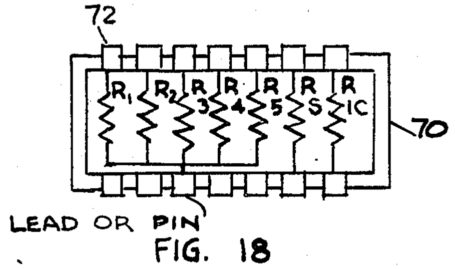
FIG. 18 is a resistor network in a dual-in-line packaged configuration.
Figure 19:
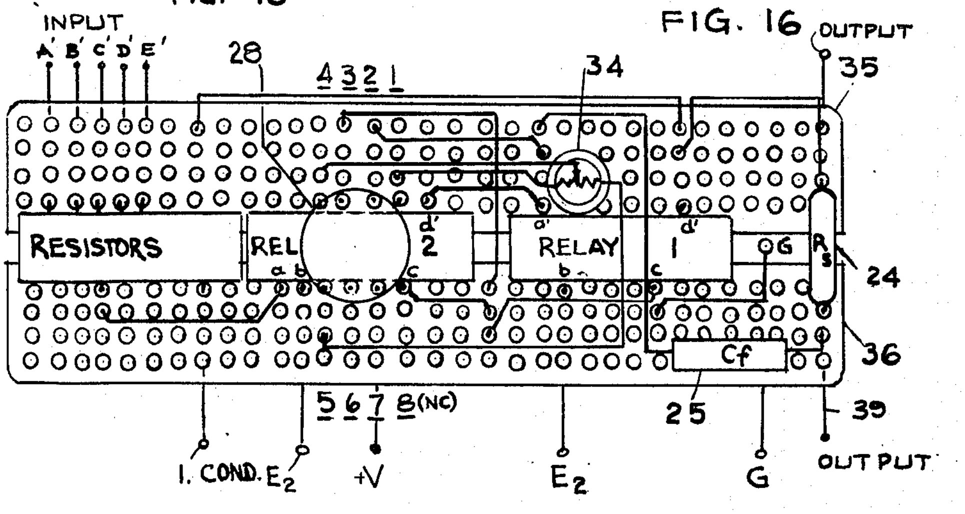
FIG. 19 illustrates the joined terminal strips shown in FIG. 3 but with the dual-in-line (DIP) reed relays of FIGS. 17A and B and an IC-compatible DIP package with a 14 lead resistor configuration. Thus all resistors on these terminal strips can be included in this package with a few extra resistors to spare. Such an IC packaged configuration is manufactured by several firms.
Figure 17A:
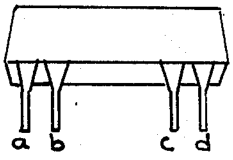
FIG. 17A illustrates a subminiature integrated circuit (IC) compatible dual-in-line (DIP) packaged reed relay as manufactured by a semi-conductor firm North American Philips Controls Corp., Frederick, Md.
Figure 17B:
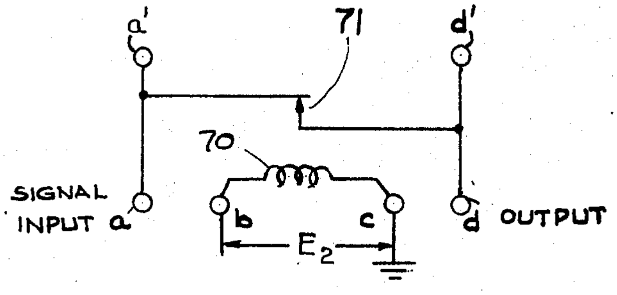
FIG. 17B is its schematic circuit diagram.

FIG. 17A is an enlarged side view of a subminiature integrated circuit (IC) compatible-packaged reed relay as manufactured by a semi-conductor firm North American Philips Controls Corp., Frederick, Md. The purpose of this physical diagram is to show how neatly such a relay package may be installed onto terminal strips such as 35 and 36 with a minimum of labor and effort to provide either the "operate" or "reset" control modes of an integrator computing component. FIG. 17B is a schematic circuit diagram showing terminals *a*, *a'* *b*, *c*, *d*, *d'*, exciting coil 70 and contacts 71. Exciting voltage $E_2$ is impressed across coil from *b* to *c* to close contacts 71. FIG. 19 is a plan view of the joined terminal strips 35 and 36 shown in FIG. 3, but with the substitution of dual-in-line package relays 1 and 2 for cylindrical relays 26 and 29 and dual-in-line, 14 lead, package resistor circuit for the discrete resistors. The latter package makes for a more compact packaging of resistors. If more than two input resistors are used, the labor and effort in installing resistors are appreciably reduced. All of the resistors required or specified either for the summing integrator computing component or for a summing amplifier component may be contained within this package. However, in FIG. 19 shunt resistor $R_s$ is shown separate from the others to permit a more logical orientation and arrangement of physical parts for the benefit of one who wishes to understand, improvise or debug the circuit layout. A side view of FIG. 19 is essentially the same as that of FIG. 4. FIG. 18 is a simple seven resistor configuration in a diagram of a dual-in-line package. The first five resistors $R_1$, $R_2$, $R_3$, $R_4$ and $R_5$ are input resistors. Resistor $R_6$ is the initial condition input resistor, and $R_s$ is the capacitor shunt resistor. It should be noted that the lower ends of the first five resistors are made common by tying them together with a conductor. The first three resistors could be of one value, say, 1 megohm. The next four resistors could be another value, say, 0.1 megohms. In the particular layout of parts shown in FIG. 19, there are six input resistors to choose from, since resistor $R_s$ within package 70 is not being used. It would have been used if resistor 24 were omitted or not used in its present location. A disadvantage of the dual-in-line package depicted in FIG. 18 is that one is married to the particular resistors within its enclosure. One could have several such packages of resistor configurations with resistors of other values in order to provide other desired gain values for an operational amplifier.

Figure 20A:
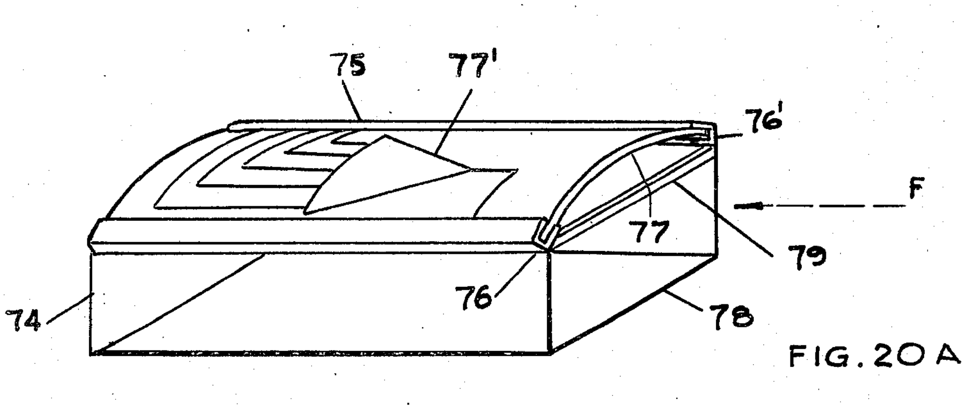
FIG. 20A shows a removable sheet illustrating a programmer's diagram of an analog computing component. The curved plastic sheet is shown inserted in a frame designed to accept said sheet.

FIG. 20A depicts a scheme for either modifying or changing a program block 77' denoting a computing function. A frame 75, having flanges 76 and 76' to accept a curved sheet 77, is shown in place. The thin sheet, if of frosty flexible cellulose acetate material, can be bulged and slid into the frame from open end 78 in direction of the arrow F shown and then held in place by hollow elastic clips as shown in FIG. 20C, one at each end of the frame, if required. Ribs 79 at both ends help support flanges of frame 75. A rectangular plastic box 74 is open at top and bottom and either is cemented to frame 75 or is molded as an integral part of it. Program block 77' on sheet 77 may be removed from frame 75 and replaced by another, should the circuits beneath be modified or completely changed.

Figure 20B:
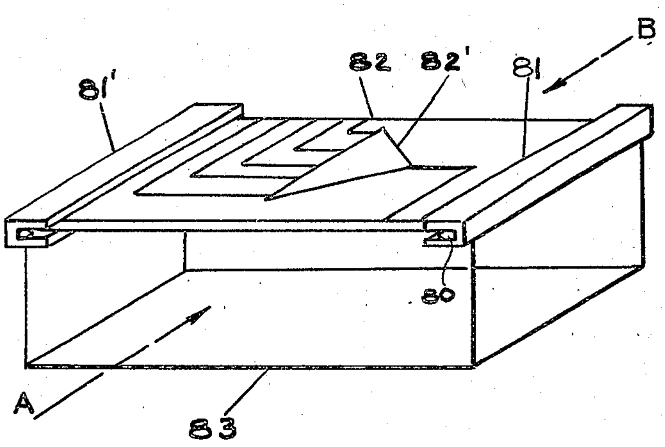
FIG. 20B shows removable flat sheet illustrating a programmer's diagram of a computing component. The inserted sheet is held in place in a flat frame.
Figure 20C:
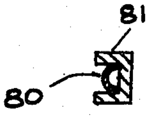
FIG. 20C shows a sectional view of a hollow semispherical elastic stop.

FIG. 20B depicts perspective view of another construction of a cover for terminal strips 35, 26 and 58, 59. A transparent or opaque plastic open box 83 supports flanged or channeled frame ends 81, 81'. Frosted or opaque white plastic sheet 82 is shown in place with opposite ends supported by being inserted in channels 84 and 84'. Sheet 82 may enter either side of box 83, in direction of arrow A or arrow B. Hollow elastic semi-spherical blips 80 help hold sheet 82 in place. A typical blip 80 is shown in FIG. 20C. Sheet 82 need not be flexible like sheet 77. Program block 82' on sheet 82 may be removed from channels 84, 84' and replaced by another, should the circuit beneath be changed, to comply with the new circuit. Several sheets like sheet 82 may be on hand, each with a different anticipated program block.

Figure 20D:
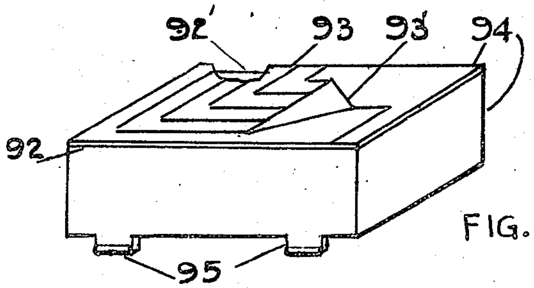
FIG. 20D shows a cover for terminal strips, simpler than in FIGS. 20A and 20B.

FIG. 20C shows a sectional side view of thin hollow semi-spherical elastic clip, cemented to side wall of channel 91. A simpler alternate cover having five sides, including a top, is shown in FIG. 20D. A frosted plastic sheet 93, having program block 93' is shown in place on top of cover 94. It is held in place by double or two-sided adhesive material, such as two-sided adhesive masking tape along sides 92, 92'.

Figure 20E:
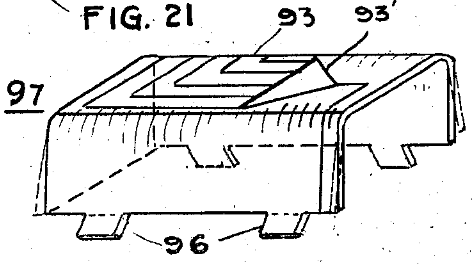
FIG. 20E shows still a simpler form of cover for terminal strips than shown in FIG. 20D. Note the tabs or projections protruding from the bottom edge for insertion into slots formed in computer panel.

FIG. 20E depicts still a simpler cover 97 with projections 96 and sides protruding slightly outward. To assemble on panel 1, sides of cover 97 are manually pressed together. Projections 96 are inserted into slots 95' and 95''. First, the two downward projections on one side are inserted into slots 95' and then the other side is pushed inward to enable its two projections to fit into slots 95''. Frosted sheet 93 with diagram 93' is mounted on top of cover. The projections and panel slots are designed to keep cover in place until opposite sides 92 and 92' are manually pressed together to enable cover's removal. Top of cover has sheet 93 containing a computer diagram 93' of the circuitry beneath. This sheet 93 is held in place by means of strips of tape underneath having adhesive on both sides. Sheet 93 with diagram 93' lies over top of box or cover 97 and can be removed and replaced by another diagram when the circuit beneath is changed to another computing component. Covers may be constructed of ferrous metal to provide a shield for stray currents surrounding the computing component. Electrical supply input wiring, input and output signal wiring and all other necessary electrical wiring enter underneath the panel 1 or 100 within the cover enclosure, so there is no need to remove said cover except for examination, debugging or modifying of electrical circuits. The wires enter either through holes between terminal strips 35, 36 or they enter through small holes in the panel, aligned to pass into terminal tie points where indicated on said terminal strips. Actually, the said covers are not absolutely necessary for the functioning of the computer. They are there to provide the mathematician with a textbook program diagram of the circuitry beneath and, perhaps, to protect it against tampering. It is expected that electronic engineers and technicians, too, would be sufficiently familiar with the electronic circuitry that such a textbook diagram would be unnecessary. As shown, terminal strips 35, 36 are removable and so are the components themselves as no parts or connections within the strips are shown soldered. For some applications and uses, some soldering of connections may be desirable to avoid parts and components from disassembling due to shock and vibration.

Figure 21:
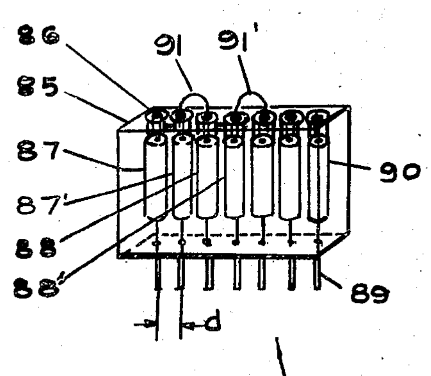
FIG. 21 shows an isometric view of a vertically-mounted resistor network.

FIG. 21 depicts a perspective view of another resistor network package. In this package, the resistor network is single-ended for vertical installation on terminal strip 35 or 36. The single-ended configuration enables a reduction in required board area and permits physically larger resistors to be used than in standard dual-in-line packages. Mounting pins 89 are spaced *d* distance apart, same as tie points on terminal strip 35 or 36. As in FIG. 18, seven resistors 90 are shown. However, only the first two resistors 87 and 87' are electrically tied together or shorted at the top and, likewise, the second two resistors are shorted. Hence, if five input resistors are to be common at the top electrically, then shorting wires 91 and 91' may be inserted in jacks 86. Jacks 86 may have captivated spring inserts, with their body tips flanged over inserts, either to help keep shorting wires in place or to keep any other inserted conducting wire in position in any of the seven jacks 86. The resistors are shown packaged inside a rectangular-shaped container 85, but it could be ellipsoid in shape.

Figure 22:
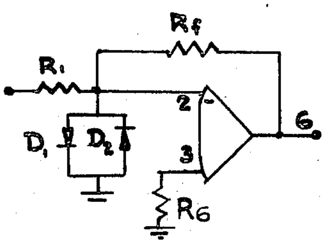
FIG. 22 shows an operational amplifier with protective input diodes.

It should be mentioned that the simplest of integrator circuits has been depicted in FIG. 7A. The operation amplifier is assumed to have a high input impedance field effect transistor at its input to permit grounding of non-inverting input terminal 3. The input offset and bias currents are considerably less for a field effect transistor than for other types of transistors. Trimmer potentiometer 34 permits nulling out the voltage offset of the operational amplifier. Most integrated operational amplifier circuits have output short-circuit protection to prevent damage to their transistors. To protect their input transistors from being destroyed, input diodes $D_1$ and $D_2$, shown in simplified circuit diagram FIG. 22, may be used when input circuits are not sufficiently protected for high input voltages, say, 0.6 volt at terminal 2. Protective diodes also are recommended at outputs of the power supply circuit where leads could be accidently reversed. The diodes would permit current flow only in the appropriate direction. Amplifier input current balancing resistor $R_6$ may be added.

Multiplier 64 shown in FIG. 13 may also perform as a squarer, divider or square root circuit depending on how it is wired. The squaring and multiplying functions are wired similar to that shown in FIG. 13 and, therefore, do not require further explanation. The division operation is performed by placing the multiplier in feedback around an operational amplifier, so that the multiplier output is summed at the operational amplifier input and forced to equal the input signal. Then the operational amplifier output Y equals the input signal Z divided by a second signal X applied to the multiplier, modified by a multiplier scale factor F. The mathematical relationship would be: $Y = F(Z/X)$. FIG. 30B is the circuit diagram, in which multiplier 157 is shown in the feedback loop of operational amplifier 158.

Now if in the above configured circuit, the X and Y inputs to the multiplier are made identical by shorting the two inputs, then its output will be its square root, modified by the same multiplier scale factor F. Mathematically, the relation is $$Y = \sqrt{FZ}$$

To accomplish the above, one of the summing amplifier circuits with gain 1 can be used by inserting analog multiplier in the feedback circuit on its output side.

The above description is given only to indicate how simply the operational amplifier circuit shown in FIG. 11A may be modified to perform various mathematical operations, functions and computations. Other circuits will be briefly cited here to bring out the enormous capability of the analog computer organization described here.

1. For example, by substituting a low leakage, high quality capacitor for an input resistor, the summing amplifier can become a differentiator.

2. An added capacitor to its existing feedback resistor can convert the simple inverting operational amplifier to a circuit which produces an amplified sum of its input signal and its integral, the gain being the ratio of feedback to input resistors. Referring now to example 1 above, a differential integrator can be formed by adding a network identical to the feedback to the other formerly grounded positive input of the basic operational amplifier. A technically inclined, resourceful student, using this versatile, adaptable computer, can improvise many other computational circuits which he may find necessary or desirable in order to solve the mathematical equations he has either formulated or been assigned. Textbooks on applications of operational amplifiers can provide the user of this instrument with a listing of a number of other computational circuits using integrated-circuit operational amplifiers.

ANOTHER PREFERRED EMBODIMENT OF COMPUTER LAYOUT

Figure 23:
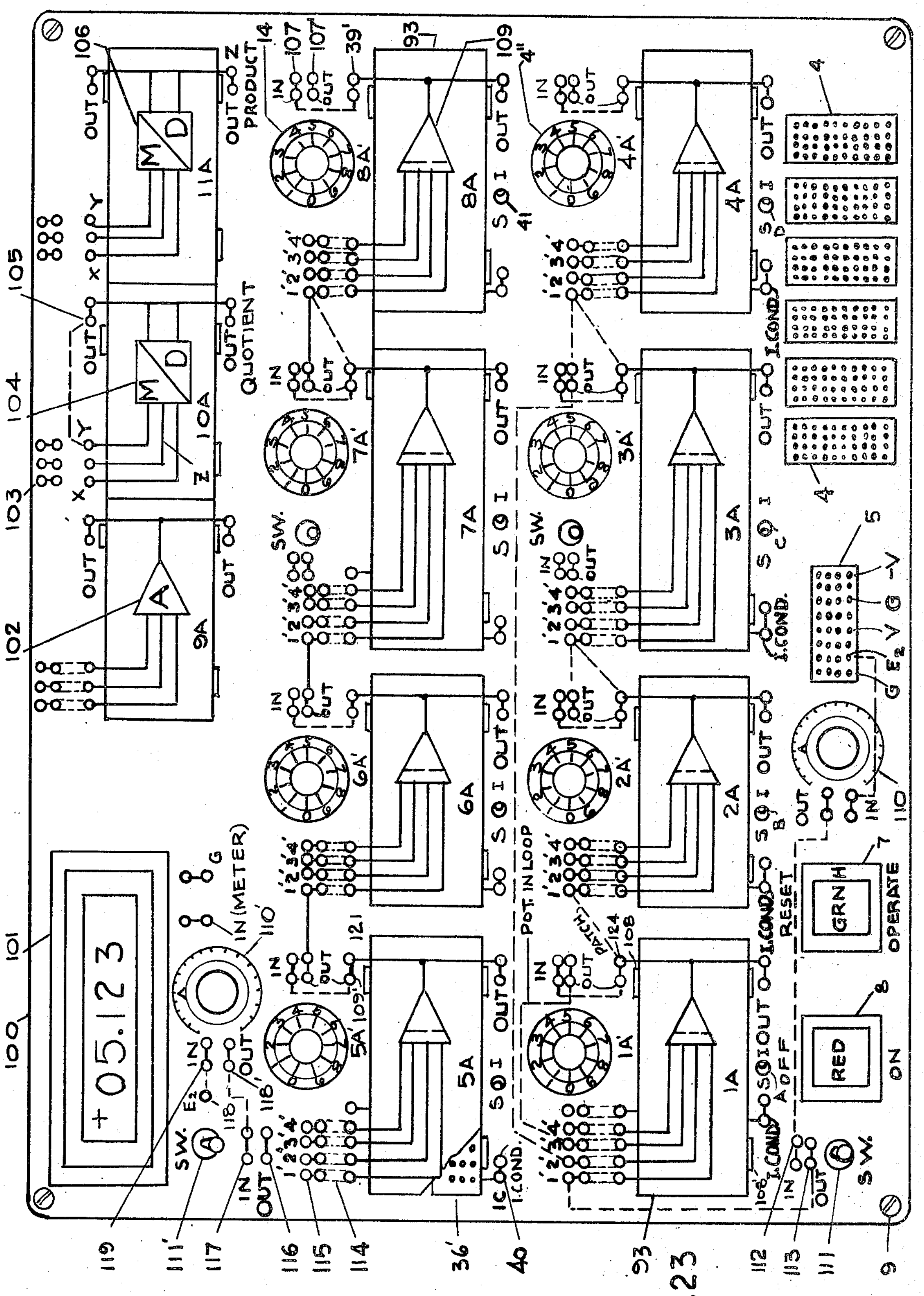
FIG. 23 illustrates another arrangement of potentiometers, computing components and input resistors. There is an individual cover, similar to FIG. 20A to FIG. 20E, for each of the eight integrators, but in FIG. 1 there may be a single cover for four integrators or computing components or they can be constructed singly as shown in FIG. 20E.
Figure 24A:
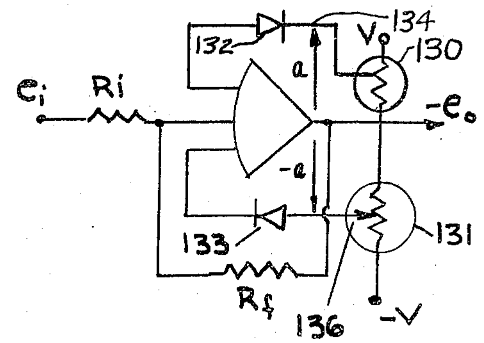
FIG. 24A illustrates a soft limiting circuit using an operational amplifier and two diodes.
Figure 24B:
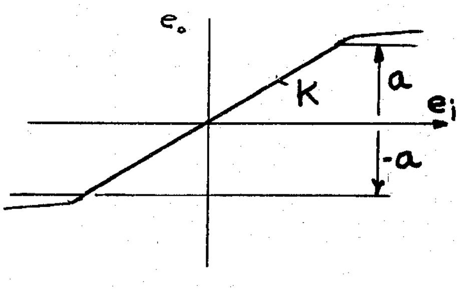
FIG. 24B illustrates the voltage input-output relationship of the limiting circuit.

FIG. 23 shows panel 100 with another arrangement of potentiometers 1 to 8, computing components 1A to 11A, and with exterior location of component input resistors, typically 114 to replace 47, FIG. 10A or to replace 70, FIG. 19. Each eight integrator terminal strips and of summing amplifier 9 terminal strip have input resistors located external to covers, typically 93. The object of such an arrangement is to eliminate patch cords as well as to facilitate removal and replacement of resistors. The removal of a resistor can open a circuit and insertion of a resistor can complete a circuit. Also, it is hoped that such an arrangement will simplify programming a mathematical problem, reducing patching and scaling errors. All eight 10-Turn potentiometers 14 and single turn potentiometers 110 and 110' have their lower end terminal grounded at the underside of panel 100. Voltage $E_2$ is available at jacks 118 and on terminal strip 5. Slots 108 and 108' are for receiving projections 95 or 96, FIGS. 20D and 20E. As an example, to illustrate the problem patching simplicity, assume a signal is to be applied to the input of amplifier 5A and that it is to be cascaded with amplifier 6A via a potentiometer for applying an attenuation coefficient factor. To begin, voltage $E_2$ at jack 118 is applied to potentiometer 110' via input terminal 119, by patching with a solid insulated wire of the proper diameter. Potentiometer output arm, available at jack 118' may be applied to input of switch 111' via jack 117. Switch output 116 is then applied to amplifier input terminal 4'. If resistor 114 is inserted as shown in the jacks provided, then the signal is applied to amplifier 5A, shown diagrammatically. Its output 109' may have been prepatched to the high side of potentiometer 5A' terminal marked IN. Actually, its ten-turn dial is shown; the potentiometer is beneath. Its OUT jack, representing its arm, is patched to the input of the adjacent amplifier 6A. If resistor 121 resembling a miniature dual banana plug has been inserted as shown, then amplifier 5A output is applied to amplifier 6A input, assuming ± V supply voltages have been applied to its integrated circuit operational amplifier 28, shown in FIGS. 3 and 19. Similarly, other potentiometers and amplifiers may be wired or joined in cascade to solve a differential equation. An amplifier, such as any of the first eight shown, may perform either as a summer of two or more signals or as a summing integrator, depending on the position of toggle switch 41, FIGS. 3 and 13. In FIG. 13, switch 41 in position 1'' makes amplifier a summing device and in position 2'', it performs as an integrator. It is desirable for switch 41 referred to in FIG. 23 as A, B, C and D to have make-before-break contacts, in case amplifier voltages ± V are being applied. Then its external feedback loop 41', FIG. 13, will never be open during the switching operation. Amplifier 9A shown diagrammatically, performs the summing-inverting operation only. However, a limiting circuit can be added as shown in FIG. 24A. Components 130 and 131 in FIG. 24A are miniature potentiometers. Position of their arms 134, 136 affects magnitude of distances *a* and *−a* and the steepness of slope K is affected by the gain in accordance with the ratio $R_f/Ri$. In FIG. 24A only a single resistor is shown to demonstrate the technique. Resistor Ri could represent any one of the four resistors $R_1$, $R_2$, $R_3$, $R_4$, FIG. 10A which are considered as external plug-in components 114 on panel 100, FIG. 23. The circuit diagram of FIG.

24A is found and explained in many textbooks on analog computers. The multiplier/divider computing components 10 and 11 are available commercially from several solid-state analog device manufacturers. A user may review the performance criteria of various designs in order to come up with the one which will meet his requirement at least cost. The key performance areas are accuracy, stability, offset drift, band width, slew rate and warm-up time to specifications. In most multiplier/dividers there are three possible inputs, $x$, $y$. $z$ and one output. For division $z$ is the divide input, $x$ the divisor and $y$ the quotient. For multiplication $x$ and $y$ are the inputs and $z$ the output. The same output terminal provides either product $z$ or quotient $y$. However, an external jumper between the output and $y$ is required, as shown in diagram 10A FIG. 23 for division. No input resistors are required for the multipliers. For consistency, their input and output jacks are in the same locations as the jacks for amplifiers, since it may be desirable to substitute amplifiers for multipliers should the computer's capacity require it for solving a particular differential equation.

A maximum of four amplifiers are required to solve a simple second order differential equation. It can be programmed using amplifiers 1A to 4A, FIG. 23. The output of potentiometer 110 would be patched to input of switch 111 at jack 112. Output 113 would be patched to any of the desired inputs of amplifier block 1A. If several amplifiers are to be programmed in cascade, then the procedure would be the same as for amplifiers 5A through 8A. If more than four amplifiers are required, then amplifier 4A may be applied to any of the five inputs of amplifier 5A via potentiometer 5A'. Red-colored switch 8 applies excitation voltages E2, +V, −V to components. Green-colored switch provides RESET, HOLD and OPERATE functions for integrators. An example exercise is offered to point out the ease with which a second order system may be programmed. Assume the equation:

$$a\ddot{x} + b\dot{x} + cx = F(t) \qquad (1)$$

$$\ddot{x} = F(t)/a - b\dot{x}/a - cx/a \qquad (2)$$

Figure 25:
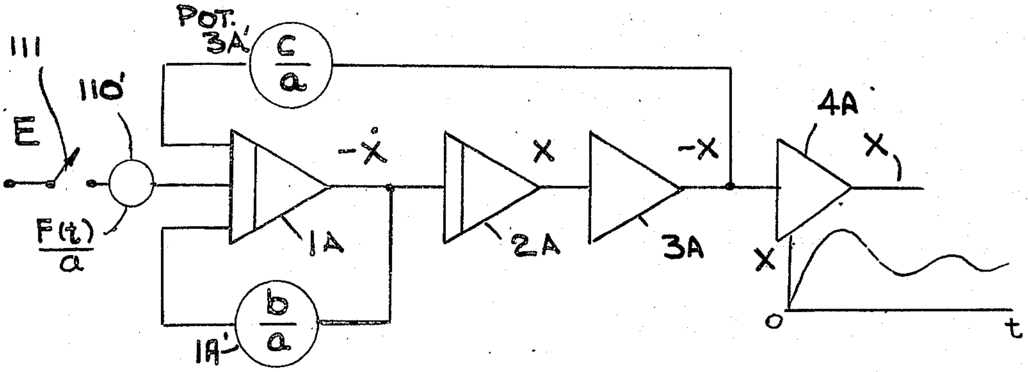
FIG. 25 is an analog computer program of second order differential equation, including a damping term.

A computer "circuit" diagram can be produced directly from the equations. Standard symbols for computer diagrams are used. Voltages at most points in the diagram may be estimated and indicated as a precaution against overloading of amplifiers. It is suggested that the diagram be drawn neatly on a clean sheet so that it can be reproduced and various other values can be assigned to parameters in case the initial solution proves to be unstable or otherwise unsatisfactory. One would number each component in numerical sequence in order to minimize possible patch-panel clutter, as shown in FIG. 25. This is a relatively, well-known computer program, but it is being introduced to demonstrate the manner in which an equation would be implemented on this analog computer. Usually magnitude and time scaling of a problem can be performed right on the computer program sheet.

Figure 27:
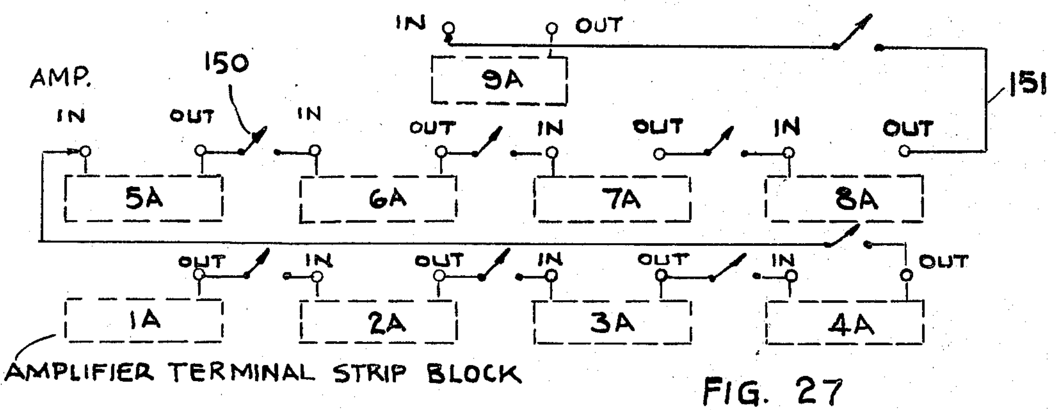
FIG. 27 shows an alternate approach to implementing a program on the analog computer. To avoid using patch cords between adjacent amplifiers, switches may be used, wired and connected as illustrated.

A signal, representing the value of $F(t)/a$ is dialed on potentiometer 110 and its output is connected to input 112 of switch 111. Switch OUT 113 is connected to input 1' of amplifier 1A. Starting with amplifier 1A, with switch A in integrate position, its output 124 is directly connected to input 1' of amplifier 2A, via "patch" with switch B in integrate position; amplifier 2A output is connected to input 1' of amplifier 3A. Then OUT of amplifier 3A is connected to IN of potentiometer 3A'; OUT of potentiometer 3A' is connected to input 2' of amplifier 1A. Similarly, OUT of amplifier 1A is connected to input 3' of amplifier 1A via potentiometer 1A'. Gains of amplifiers are determined by values of input resistors. Potentiometers attenuate the signal between zero and one. Hence, the decimal fractional value of $c/a$ is set by adjusting knob of potentiometer 3A' to the desired value. The decimal fractional value of $b/a$ is set similarly by rotating knob of potentiometer 1A' To avoid patching between amplifiers 1A and 2A, 2A and 3A, 3A and 4A, 4A and 5A, when connecting them in cascade, one can use SPST toggle switches as shown in FIG. 27. The switches may be mounted on panel 100 at the lower right corner. In equation 1, if one wished to vary parameters or the coefficients of the variables, for other output responses one could do so by varying potentiometers 1A' and 3A'. It should be noted on FIG. 25 that amplifier 3A provides a negative output. For a positive output, apply the output of amplifier 3A to a recorder. Potentiometer 1A' controls the amount of oscillation of the response.

Figure 26B:
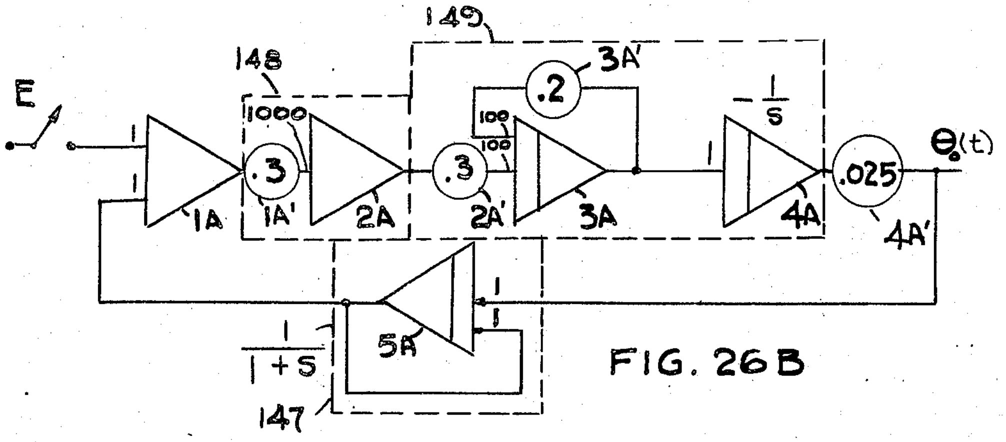
FIG. 26B is the analog computer program of the block diagram shown in FIG. 26A. Direct simulation bypasses mathematics.
Figure 26A:
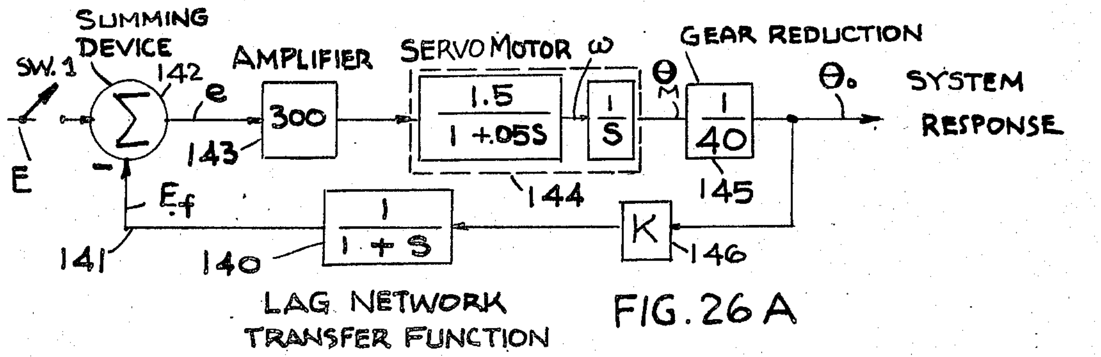
FIG. 26A represents a block diagram of a single-loop servo-mechanism with a lag circuit in the feedback loop.

FIG. 26A represents the block diagram of a single loop sevromechanism with a lag circuit 140 in the feedback loop 141. Signal E is applied to summing device 142 when switch 1 is closed. Its output is an error signal since feedback signal $E_f$ subtracts from the input signal e. Error signal E is amplified with a gain of 300. Amplifier 143 output is applied to block 144 representing a servometer. The motor's displacement $\theta m$ is reduced by a factor of 40. Output mechanical displacement $\theta o$ is converted to an electrical signal by transducer 146 denoted by K, which for simplicity is assumed to have the units of one volt per radian. The transfer function of this system is:

$$\frac{\theta_o(s)}{E(s)} = \frac{225(s+1)}{(s^3 + 21s^2 + 20s + 225)}$$

By cross-multiplying numerator with denominator as indicated by arrows, the resulting equation would appear in the form of Equation 1 though it would be a third degree. The resulting computer program would require 8 amplifiers and five potentiometers. However, if a direct simulation approach is taken, in which each transfer function within a block of FIG. 26A is simulated, then the computer program would be as shown in FIG. 26B. This approach not only takes less time to prepare but results in fewer amplifiers and potentiometers. Look up tables have been set up, found in various text books, for implementing transfer functions, such as for a lag circuit, identified by block 147, FIG. 26B. In FIG. 26B, summing device 142 is represented by amplifier 1A, amplifier 143 is block 148 (which consists of potentiometer 1A' and amplifier 2A), servomotor 144 by block 149, gear reduction 145 by potentiometer 4A', block 146 is assumed to have K equals 1 and Lag network 140 by block 147. Note that there are an odd number of amplifiers in the total loop so that the feedback is negative as specified in FIG. 26A. FIG. 26B may be simplified by lumping potentiometers 1A' and 2A' into one having a value of .09. Also since the system, as shown is linear, amplifier 2A with a gain of 1000 may be distributed between amplifiers 2A and 4A, making amplifier 2A a gain of 100 and amplifier 4A as gain of 10, or gain of amplifier 2A may be reduced to 1000 by increasing the value of potentiometer 4A′ setting from 0.025 to 0.25. Program shown in FIG. 26B may be implemented on computer in the same manner as program in FIG. 25 was implemented, using external patch cords. In this servo problem, to speed up problem solution by a factor of 10, reduce the size of integrator capacitors by a factor of 10. This is accomplished by simply removing the 1 microfarad capacitor on the terminal strip associated with the integrator number and replacing it with a 0.1 microfarad capacitor. Patch cords may be almost completely omitted by taking advantage of the switching circuits shown in FIGS. 27, 28, 29 and 30. Only the SPST toggle switches would be exposed. All wiring between switches, and and amplifiers and potentiometers is located under panel 100, FIG. 23. All switches are located in a central area on computer cabinet and are clearly captioned to indicate the two connecting points.

Figure 28:
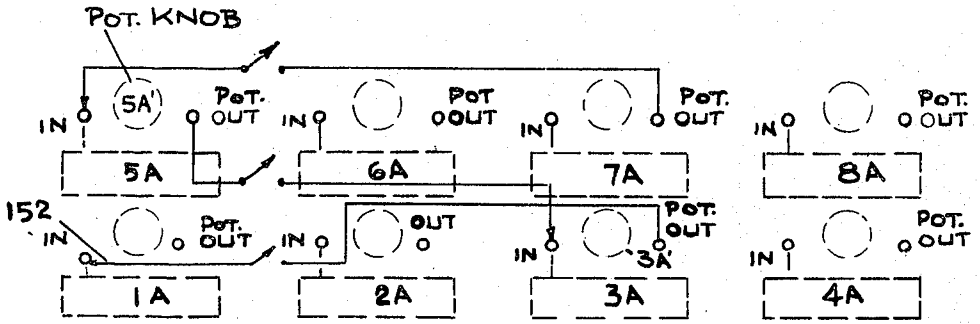
FIG. 28 illustrates switch positions and wiring for making feedback connections between an odd potentiometer output and an odd amplifier two amplifiers behind.
Figure 29:
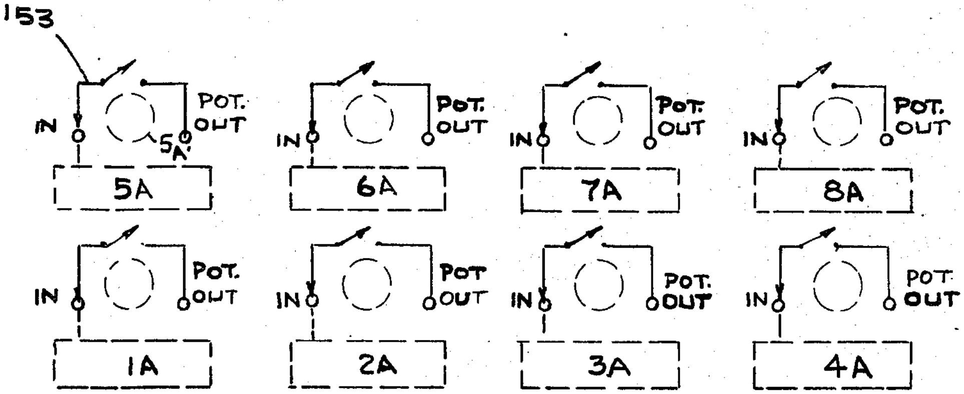
FIG. 29 illustrates switch positions and wiring for making feedback connections between the output of an odd potentiometer and an odd amplifier of the same number.
Figure 30:
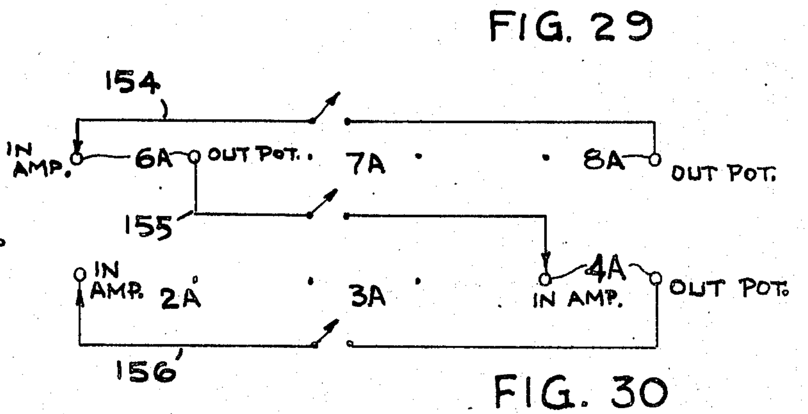
FIG. 30 illustrates switches in the feedback connections between an even-numbered potentiometer output and an evennumbered amplifier two amplifiers behind.
Figures 31A, 31B:
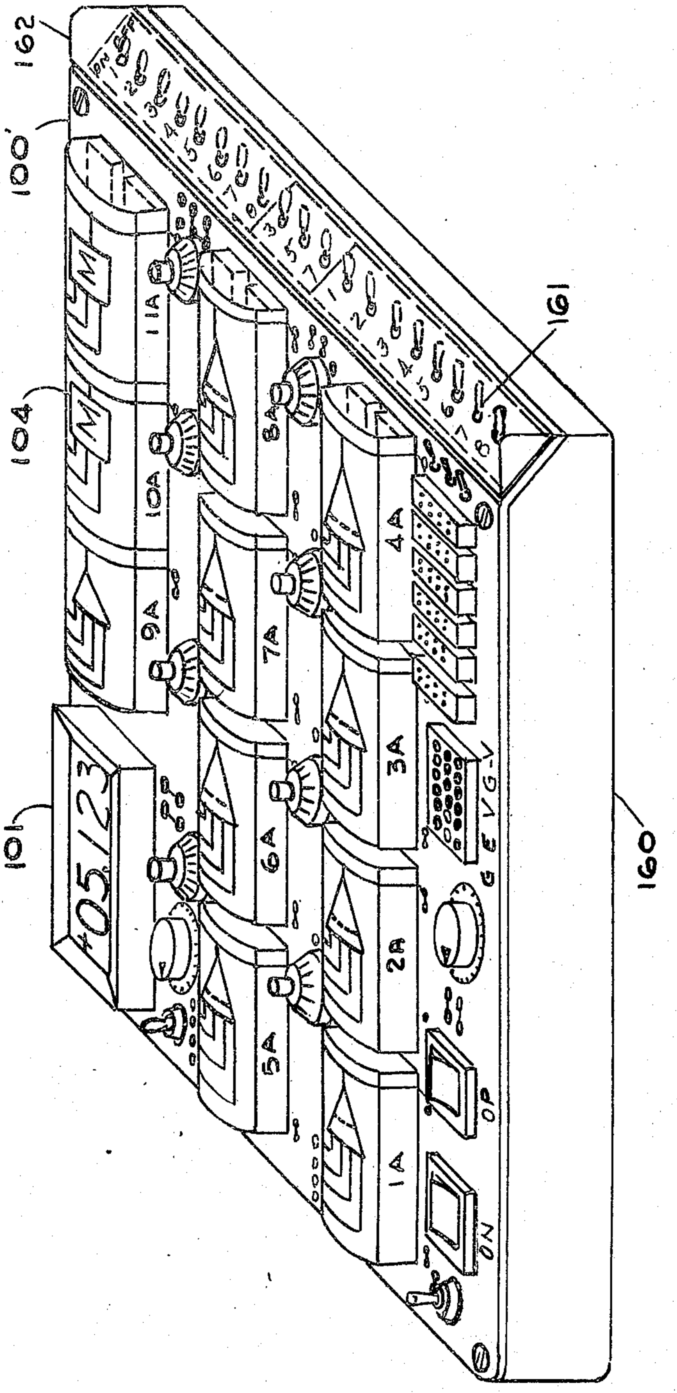
FIG. 31A shows a perspective view of an analog computer including its cabinet. The physical location of the switches for making connections between selected components are shown at the cabinet's right side. The last three of the 22 switches are shown on panel 100, lower right corner.
FIG. 31B shows a list of connections between selected components. Each connection between components is made with a switch, physically shown in FIG. 31A. All switches for making component connections may be located in the approximate positions shown in FIGS. 27, 28, 29, and 30 in order to keep lengths of wires as short as possible.

To avoid using patch cords between adjacent amplifiers, switches as shown in FIG. 27 may be used. Wire 151 goes from the output jack of one amplifier to the input jack of the adjacent amplifier. The switch, typically 150, may be located at the lower right hand corner of panel 100, FIG. 23. Eight SPST switches are indicated between amplifiers 1A and 9A. This enables one to have a choice between patch cords and switches to make connections. When the switches are in the off position, they will not interfere with the use of conventional patch cords which may be preferred by the beginner. Also connections are many times required between odd components, such as feedback from an odd potentiometer to an odd amplifier. In FIG. 28, the feedback begins with potentiometer 3A′ output to amplifier 1A input. The actual total feedback loop for path 152 would be from amplifier 3A included out to amplifier 1A input with potentiometer 3A′ in the loop. The patch cord from amplifier 3A output to potentiometer 3A′ input not shown in FIG. 28 but shown in FIG. 23 is short and many times need not be removed. If potentiometer 3A′ is not required in the loop, it may be set to 1 and the switch can still be used. The orientation of amplifiers as shown on panel 100, FIG. 23 is retained and indicated by dashed lines so that the purpose and function of the switches may be readily understood. For simulating a lag network, feedback from a potentiometer to the input of its adjacent amplifier is desirable, such as path 153 connecting potentiometer 5A′ output to amplifier 5A input. Again the patch cord from amplifier 5A output to potentiometer 5A′ input, not shown, is short and normally need not be removed, when once inserted. Again the positions of the first eight amplifiers and eight potentiometers are the same as on panel 100 and are shown in dashed lines. Because there are as many as eight integrators, eight such switches and feedback paths are shown in FIG. 29. FIG. 30 shows a circuit diagram similar to that of FIG. 28, except now even numbered amplifiers and potentiometers are connected with SPST switches in between. As in FIG. 28, FIG. 30 shows three such paths 154, 155, and 156 with a switch in each path. To save space, the outlines of amplifiers and potentiometers are omitted. The right side of panel 100, FIG. 23 may have a sloping extention to accommodate most of the said switches, as indicated in FIG. 31A, should panel 100 have insufficient room. Switches 161 for making component connections are located under a hinged cover 162 to protect switch settings when they are unused. Each switch's function as to connecting one component to another is identified, such as from Potentiometer 3A′ to amplifier 1A. The listing of switches, FIG. 31B, such as would be indicated under cover 162, is shown along side cabinet 160. The component numbers listed in FIG. 31B agree with those shown on FIGS. 27, 28, 29 and 30. Although the switches indicated diagrammatically in the said figures are shown proximate to the components they control, they may be located elsewhere, such as along right side of cabinet 160 under cover 162, for convenience. Because of the sloping extension of the right side of top panel in order to accommodate switches 161, panel of computer being longer is now assigned 100′, FIG. 31A. Six terminal strips 4, FIGS. 1 and 23, not only enable insertion of R-C components for filtering and stability compensation of a control circuit but also enable insertion of active components and integrated circuits. The 40 tie points indicated on each of six strips have holes which pass through either panel 1 or 100, or FIGS. 1 and 23. Hence, supply voltages for either logic or analog circuits can be available at any of the tie points. Certain automatic control circuits, such as self-organizing controllers, require logic circuits, such as flip-flops, electronic comparators, shift registers, AND and OR gates, NAND and NOR gates and NOT gates. These come in dual-in-line packages, flat packs, TO-5 cans and in other package shapes and forms. The DIP package or TO-5 can neatly straddle across two terminal strips as shown in FIG. 19. Electronic comparators are used to convert an analog signal into a two level or binary signal and may be classified as analog-to-digital converters. Hence, via the analog comparator an analog signal or system may interface with a digital system, involving logic computing components such as those enumerated above. Other examples of hybrid control systems are: 1. phase-locked loops for motor-speed control, IEEE Spectrum, April, 1973; 2. "Stepping Motor Speed Control", U.S. Pat. No. 3,818,261. Such systems described in technical literature, including motors, can be simulated on a compact computer such as the one presented here. Systems, such as the above two, can be simulated, designed, optimized and evaluated under various environmental conditions on hybrid computers prior to their hardware fabrication, thus saving time and reducing design and fabrication costs.

Figure 32A:
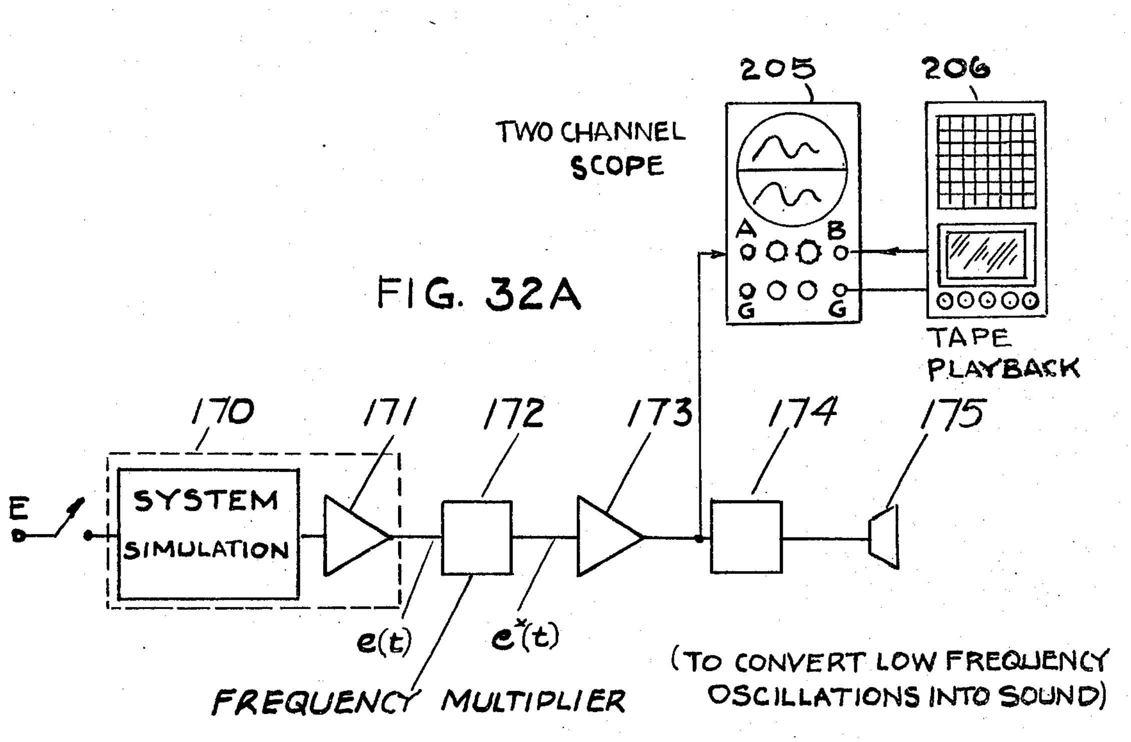
FIGS. 32A and B show instrumentation added to the computer for converting signals into sound.
Figure 32B:
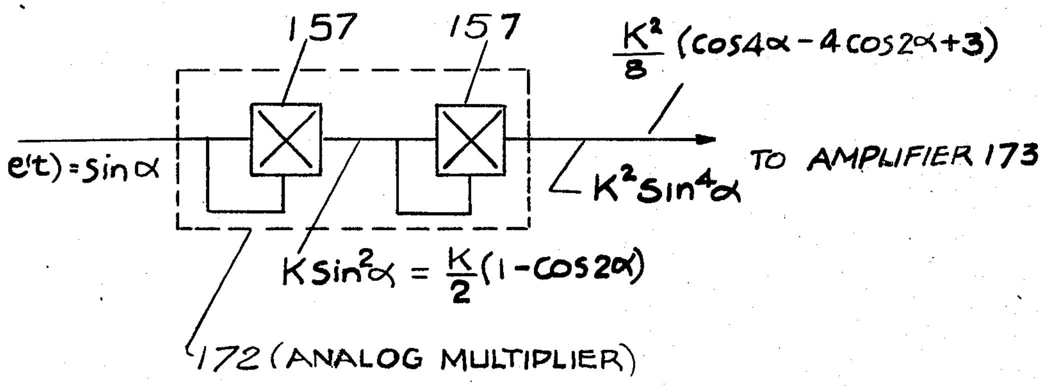

In order to make an even greater impression on a student studying mathematically-oriented technical subjects, including the understanding and significance of underdamped physical systems, the computer system response oscillations can be made audible using a miniature electronic frequency-to-audio conversion system, as shown in FIG. 32A. Assuming, for example, that the system simulated is an underdamped closed-loop servomechanism 170, its output signal is applied to a signal frequency multiplier 172 from operational amplifier 171, FIG. 32A. Since most underdamped simulated in real time have relatively very low frequencies, it would be necessary to increase the frequency of oscillation in order for the speaker to be responsive to the oscillations and the frequency multiplier can perform this function. The multiplication could be performed by using two or more frequency doublers in cascade, in which the magnitudes of the sine wave oscillations would be preserved. Frequency multiplier 172 could consist of two or more frequency doublers in cascade, as shown in FIG. 32B. The multiplier's output signal $e(t)$ may be applied to a relatively high output current, one-or 2-watt integrated-circuit operational amplifier 173. The output of said amplifier 173 is applied to a 5 watt audio amplifier 174 in order to boost the signal's current magnitude further. Now the signal may be applied to the coil of a woofer speaker responsive to frequencies as low as 8 cycles per second. With the aid of audible sounds the student, particularly a blind student studying control systems, can better appreciate the significance and meaning of the oscillations, through recognition and interpretation of the sounds, having once associated the sounds with various system damping ratios. These sounds could be stored on tape and played back by the blind student for comparison between sounds of known systems and sounds being produced by the speaker.

A simpler approach to frequency multiplication is to reduce the capacitor sizes of the system integrators by a suitable factor, such as by 5, 10, 20 or 100, so that the resulting frequency may be sufficiently high to be audible when applied to speaker 175. Of course, the multiplication factor should be taken into account when listening to the audible sounds from speaker 175. A blind student could easily implement and operate this computer if the coefficient-setting potentiometers, too, were redesigned to enable a blind person to set the desired coefficients by feel. In addition, both operating instructions and the identifying captions, including numbers, on the computer panel and computing module covers would be written in Braille, in which the characters consist of raised dots to be read by the fingers.

As mentioned above in order to enable both blinded and sighted persons to use this computer, the commercially-available ten-turn potentiometers have been redesigned as incremental displacement potentiometers, cylindrically-shaped and with rotatable flexible sleeves, faced with either arabic or Braille numerals. FIG. 33A illustrates a number of cylinders, usually three or four, ganged in cascade fashion. Each cylinder consist of a fixed central portion 181, including resistors 186 and bars 188, and an exterior rotatable sleeve 180', as shown in sectional view FIG. 33B taken along B—B, FIG. 33A, and designated by the numeral 180. Ten captured recessed rectangular-shaped resistor elements 186 non-metallic encased, are held outward by a spring coil 183 underneath each one. Springs 183 are supported at their lower ends by a narrow-in-width w cylinder 184. FIG. 33C shows a sectional view of one of the cylinders taken along C—C, FIG. 33A. Numerals 180 and 182 refer to cylinder assemblies. A hollow nonmetallic cylindrical shaft 187 passes through the center of cylinder 184 to support assembly of several such sleeve and cylinder assemblies 180 ganged together. Nonmetallic shaft 187 is hollow to permit insulated conductors including ground and signal wires to pass through, if desired. Electrical contacts for resistor 186, FIG. 33H, are made by metallic captured balls 185 and 185', spaced distanced apart, and bar 188, both contact surfaces being gold-plated for low contact resistance. Bar 196 is held in place by a hollow nylon rod 190 through which a conductor connected to bar 196 passes for making electrical connection to input. The rod is made of resilient nylon in order for bar 196 to have some give when ball 185 comes in contact with it. Bar 196 is half of an elongated bar and is insulated from the other half 196'. Each bar is connected to a resilient nylon rod and to conductors 195 and 194. Insulated conductor 195 passes through hollow center of shaft 187 and is connected to bar identified as 10, FIG. 33G, of adjacent cylinder and sleeve assembly 180. The second half 196' of elongated bar also has an attached conductor 194. Insulated conductor 194 passes through hollow center of rod 187 and is connected to a bar identified as 0, FIG. 33G. When projection 186' on sleeve 180', FIG. 33H, makes contact with resistor surface 186', resistor 186 is depressed and metallic conductors 189 lose contact with bar 188. Electrical connection between rotatable surface 180' and stationary portion 181 is made by berylium copper wire spring wipers 191 and 193, FIG. 33C, resting against gold-plated grooved surfaces of cylindrical flanged disks 192 and 197. The pulley-like flanged disks 192 and 197 are separated from each other by insulation. Conductors from the flanged disks 191 and 193 connected to the extremities 0 and 10 of the second group of resistors, similar to FIG. 33F, each resistor having one-tenth the resistance of each of the previous 10 resistors. Note that for each group of 10 resistors, two contact points are required, one contact at each end of a single resistor whose resistance is to be subdivided into 10 equal resistances, except for the final group of 10 equal resistances. This last group of 10 will need only one contact point, as shown in FIG. 33G. Thus, the contact points for these final points are as shown in FIG. 33E by balls 185 on sleeve 182'; two points are necessary since the resistors are oriented at an angle of 45° with the horizontal, as shown in FIG. 33F. For all other rotatable sleeves four contact points are required, represented by balls 185 and 185', in order to implement the schematic diagram shown in FIG. 33G. For the contact shown in FIG. 33G, an attenuation value of .8641 would be provided, assuming no loading of potentiometer output. Balls 185 and 185' are electrically insulated from sleeve 180' and make electrical contact with junction points 191' and 193', respectively of wipers 191 and 193 in FIG. 33D, a development of sleeve's 180' inside surface, two balls identified by 185 are electrically shorted, as well as the two balls identified by 185'. Final contact point 185, shown in FIG. 33E, requires only a single set of wipers 191. A set of three incremental potentiometers are shown in FIG. 33I. The three are supported by tubing 187, which in turn are supported and held in place by non-metallic bracket 200. Bracket 200 contains jacks on base portion 201 for receiving the input and output leads 202 and 203 of each potentiometer 204. Sets of three or four such potentiometers supported by brackets 200 similar to that shown in FIG. 33I may be mounted on top panel of analog computer with several screws to replace the ten-turn potentiometers 14 shown in FIGS. 1 and 23 to enable a blind person to operate computer. In FIG. 33I, gangs of three cylinders in cascade are shown, instead of four as shown in FIG. 33A, as in many situations three digit accuracy is sufficient. Bracket 200 need not be more than one inch deep.

FIG. 33H is an enlarged view taken in the direction of H, FIG. 33F, showing the relationship of sleeve 180' to exterior of fixed portion 181 of potentiometer. When sleeve is manually rotated to enable ball contacts 185 and 185' to move from points 0 and 1 to 1 and 2 corresponding to numbers on sleeve 180', then balls 185 together with riser or projection 186' move. Ball at centerline L1 moves to L2. Ball at centerline L2 moves to L3; and centerline of resistor 186 moves to C2, so that riser 186' now depresses surface 186'', opening contact surfaces 189 at C2. Contact surfaces 189 at C1 now make electrical contact. It should be noted that bar 188 is split. The two halves are insulated from one another to allow a beginning 0 and an end 10 for the incremental displacement potentiometer. Spacing *d* between increments is constant. Cross-section lines are omitted in FIG. 33B to avoid confusion, also in FIG. 33H. Wires from contact points of balls 185 connect to split bars 188, FIG. 33H, at points 0 and 10, FIG. 33G by way of wipers 191 and 193 on the adjacent cylinder of the same potentiometer. For the first cylinder only, attached conductor 194 to split bar 188 goes to ground from the zero point. The other attached conductor 195, connected to the other half of bar 188, goes to a signal input jack. It should be noted that not only plug-in tie points of terminal strips may be solderless but also all jacks 10, 11, 12, 15 and 16 indicated and mounted on panels 1 and 100 may be jack-jack connectors, as shown in FIG. 9C, and require no soldering thereto. It also should be noted that disk 198 with grooved index mark 199 to denote zero value and starting point of potentiometer setting is attached to shaft 187 and does not rotate.

This computer presents an opportunity for a person to be challenged in his work or avocation. It promotes creativity by the individual. In addition to analyzing systems and circuits it enables him to improvise new circuits to perform new and useful functions.

Briefly, this computer's principal merit lies in its novel organization of parts for the purpose of simplifying its construction, enabling modification of circuits simply without unsoldering and programming of mathematical equations and systems faster than programming with other analog computers of comparable size. A part of the simplification lies in the fact that all parts except power supplies are located on a single panel. The parts are organized so that computer modules and connections can follow the directions of signal flow. This also enables easier debugging of circuits and connections. Integrated circuits are fully utilized in order to reduce the size and weight of the entire computer package.

The implementation and beneficial effects of converting a system response to audible sound waves is reviewed here. Referring to FIG. 32A, outputs of known systems are prerecorded on tape. Damping ratios are noted. Then a blind person programs a known sysem whose output has been recorded. He plays back the tape on recorder 206 while listening to the output of his own programmed system over speaker 175 for comparison. If the sounds from the two speakers sound alike, then the blind person has performed the programming satisfactorily. A sighted person not only can listen to both the tape playback 206 and speaker 175, but he also can see the response waveforms displayed on two channel oscilloscope 205, thus impressing on his mind both the appearance of the system response and the associated sounds. This audio-visual combination should help him retain the information longer and the interpretation thereof as being good, bad or in-between. It is assumed that both tape playback and system simulation speakers have identical frequency responses.

In FIG. 3, showing computing module, switch 41 may be located exterior to terminal strip 36 on panel 100, as shown in FIG. 23.

Jacks for the IN and OUT connection of incremental displacement potentiometers, shown in FIG. 33I, may be jack-to-jack connectors as illustrated in FIG. 9C.

SYMBOLOGY AND TERMINOLOGY AS USED IN FOREGOING SPECIFICATIONS SUBMITTED FOR PURPOSES OF CLARIFICATION

Analog Computer = A computer which represents variables by physical analogies in continuous form, such as amount of voltage. An analog computer measures, whereas a digital computer counts. It will accept information, process it in accordance with a "program" and produce answers (outputs) derived from this process.

Amplifier, Operational = d-c integrated-circuit (IC) packaged amplifier as a replacement for any low power amplifier, which has high input impedance and low output impedance and is capable of developing bipolar output signals from bipolar input signals.

Attenuator = A voltage-dividing potentiometer or resistor network for multiplication of a variable voltage by a positive constant whose magnitude is less than unity.

Amplifier, Integrating = An integrated circuit amplifier with a capacitor in the feedback loop to provide an output voltage proportional to the integral of one or more input variables.

Amplitude Voltage Scaling = The constant of proportionality relating a voltage to a physical variable having an estimated maximum value is the scale factor.

Amplifier, Summing = An amplifier with a summing junction at its input at which signal current from input resistors and a feedback resistor are summed. Its output voltage is a linear combination of the input voltages.

Comparator = A differential input amplifier used to compare the voltage levels at its two inputs and having high gain so that only small voltage differences are needed to switch the output voltage from one polarity to the other. To be more specific, it compare the instantaneous value of a signal voltage at one input against a reference voltage on the other input and produces a digital one or zero level at its output depending on which of the two inputs is higher. It may be used to perform any one of the following functions.

1. Variable threshold detector, when the reference is not constant.
2. Pulse-height discriminator.
3. Voltage level comparator for analog to digital conversion.

Gain of Amplifier or System = Ratio of instantaneous magnitudes of output to input voltages.

Operating Mode Controls = The primary operating modes of reset, hold and compute or operate, manually controlled by a three-way switch.

Integrated Circuit = A microcurcuit consisting of interconnected elements inseparably associated and formed on or within a single substrate to perform an electronic circuit function.

Microcircuit = A circuit having a high equivalent circuit element density, which is considered as a single part composed of interconnected elements on or within a single substrate to perform an electronic circuit function.

Element = A constituent of a microcurcuit that contributes directly to its operation.

Microcircuit Module = An assembly of microcircuits or an assembly of microcircuits and discrete parts, designed to perform one or more electronic circuit functions. For the purposes of specification testing and maintenance, it is considered invisible.

Computing Module or Component = The basic units of the computer, namely, (1) integrator amplifier, which is capable of summing input voltages, too, (2) Summer Amplifier (3) Inverter or amplifier with a single input, (4) multiplier/divider capable of multiplying or dividing variable voltages and possessing an inherent scale factor.

Computing Module Terminal Strip = A universal breadboarding matrix possessing many solderless, plug-in tie points to accept DIP's, TO-J's, flatpacks and discrete components with solid lead diameters up to .032 inches. Each terminal on said strip consists of four solderless, plug-in tie points called a "quad", one point for component lead, two points for input and output connections and one point for test probe contact. The strips are designed to be mounted on panels.

DC Voltmeter = A d-c micro or milli-ammeter with a fairly large resistance in series so that the maximum expected input voltage will give full scale deflection of the needle.

Debug = To isolate and remove all malfunctions from a computer.

Limiter = A circuit which holds a signal waveform within prescribed amplitude limits.

Patch Cord = Short electrical conductor lead for interconnecting computer modules; the connections are made by inserting ends into jacks.

Momentary-On = In order for switch to be on, manual pressure must be maintained at switch position.

Patch Panel = Panel having jacks into which patch cords are inserted to make positive electrical connections between points.

Reed type Miniature Relay = High speed switch containing a light weigh contact needle, activated by an excitation voltage for opening or closing $s$ circuit.

Simulation = The representation of physical systems and phenomena by modeling on a computer.

Switch = A device to make or break a circuit or transfer a current from one conductor to another.

Terminal Strip Computing Module = A universal breadboard maatrix, designed to be panel-mounted, possessing many solderless plug-in tie points to accept DIP's, TO-5's, flatpacks and discrete components with solid conductor diameters up to, say, .032 inch. Each terminal on a strip consists of four solderless plug-in tie points called a quad which may be parceled out as follows: one point for component lead, two points for input and outputs connections and one point for test probe contact.

Hybrid = A mixture of digital and analog computing modules.

Flip-flop = Bistable device capable of assuming two stable states, a given state depending upon the pulse history of one or more inputs, and having one or more outputs.

AND gate = A signal circuit, with two or more input wires, which has the property that the output wire emits a signal only if all input wires receive coincident signals.

OR gate = A signal circuit which will yield an output signal whenever there is at least one input signal on a multichannel input.

NOT gate = Phase or pulse inverting circuit.

NAND = Not - AND gate

NOR = Not - OR gate

Shift Register = A circuit which will shift a digit or group of digits either to the left or to the right.

Lag Circuit = A circuit simulated by a first order system in which the output response rise time is controlled by the magnitude of its time constant.

SYMBOLS

C = Capacitor

DIP = Dual-in-line package

H = Hold, a mode in which the integrator outputs remain constant at the last value achieved before entering the hold mode.

I C = integrated circuit.

IN = Input

J = Junction of amplifier

O = Output

POT = Coefficient potentiometer

R = Resistor $s$ = Laplace complex variable and operator = $\sigma + j\omega$, where $\theta$ = real part and $j\omega$ = imaginary part in the $s$-plane.

$t$ = time $x$ = variable $\dot{x} = dx/dt$, the derivative of $x$ with respect to time $t$.

$\ddot{x} = d^2x/dt^2$, the second derivative of $x$ with respect to time $t$.

Init. Cond. = initial condition

I = integrator

G = ground

I. Cond. = initial condition

Underdamped System = a linear system having a transfer function of the type:

$$\frac{\text{Output}}{\text{Input}} = \frac{(s^2 + 2\zeta\omega_{n1}s + \omega_{n1}^2)(s^2 + 2\zeta\omega_{n2}s + \omega_{n2}^2)}{s^n(s^2 + 2\zeta'\omega'_{n1}s + \omega'^2_{n1})(s^2 + 2\zeta'\omega'_{n2}s + \omega'^2_{n2})}$$

in which $\zeta$ = damping ratio$<1$ for one or more quadratic terms $\omega_n$ = natural frequency $s$ = laplace transform Damping ratio = ratio of actual damping coefficient to the critical damping coefficient of a second order plant system in which a critically damped system yields a response without any overshoot. In the second order equation: $s^2 + 2\zeta\omega_n s + \omega_n^2$, $2\zeta\omega_n$ = damping coefficient and $\zeta$ = damping ratio.

While various aspects of the invention have been set forth by the drawings and specifications, it is to be understood that the foregoing detailed description is for illustration only and that various changes in circuitry, as well as the substitution of equivalent constituents for those shown and described, may be made without departing from the spirit and scope of the invention as set forth in the appended claims.

What is claimed is:

1. An analog computer structure for solution of differential equations which, in addition to active computing components, includes coefficient potentiometers of the incremental displacement type, wherein said panel includes coefficient potentiometers of the incremental displacement type, said potentiometer consisting of three or more cylindrically-shaped fixed portions mounted on a common hollow nonmetallic axle and each having an exterior rotatable sleeve held in position horizontally, faced with numerals from zero to ten, said fixed portions mounted side by side, so that even a blind person may be capable of rotating said sleeve and setting the desired attenuation value in appropriate digital numbers by feel, each said fixed portion having ten captured recessed rectangular-shaped resistors of equal magnitude and connected in series fashion, each of said resistors encased in hard insulation material and each said resistor having rigid electrical leads attached at each end, each said lead making electrical contact with a conductive bar and each said bar attached to a non-metallic hollow rod passing radially to the exterior surface of said axle; each said resistor held outward by a coiled tension spring located beneath each, each said spring supported at its lower end by the solid material of said fixed portion; said electrical contacts for a single one of said resistors made by two metallic captured balls and a riser beneath said sleeve, said riser pressing against one of said resistors and causing same to lose electrical contact with adjacent resistors, said two captured balls being connected to the zero and 10 ends of 10 other resistors serially connected around an adjacent cylindrical fixed portion, each of said balls electrically connected thereto via a set of spring wipers, each said set making electrical contact with one of two grooved conductive cylindrical flanged surfaces, separated electrically by insulation material, each said zero and 10 conductive bars having a conductor attached thereto, said conductor passing through said hollow rod and through said hollow axle and connected to each of two of said flanged surfaces of an adjacent said cylindrically-shaped fixed portion, said fixed portion having an exterior marker denoting said zero conductive bar location and exterior of said sleeve having indentations at the location of each said number so that when an indentation aligns with said marker, the numerical value of the total number of resistors connected in series is identified by said number and represents an attenuation digit with its decimal point determined by said fixed portion's position relative to other said fixed portions mounted on said common axle.

2. An analog computer structure for educational and experimental purposes, comprising a cabinet, a top panel on said cabinet, a plurality of computing modules consisting of terminal strips having solderless tie-points on which are mounted electronic circuit components external to and associated with each computing module with circuit components and a plurality of coefficient potentiometers mounted on said panel for forming an analog model of a physical system, a plurality of input and output jacks mounted on said panel, said circuit components mounted on terminal strips having solderless tie-points for solderless mounting of integrated circuit packages and discrete impedance components, means for said strips to be securely mounted and yet removable without any unsoldering operations from said panel, means for interconnection of said computer modules and potentiometers to perform desired computer functions, voltages responsive means, at least one potential source mounted within said cabinet, switching means for applying signals to simulated models, switching means for converting summing amplifier circuits into integration computing circuits, and wherein said integration circuits include reset mode, hold mode and compute mode relays; said reset mode enables each of said integration modules to be set to its initial value before computation, and in the compute mode said compute relays are energized and said reset relays are deenergized allowing an applied voltage to appear at said integration computing circuit output and said relays are deenergized in the hold mode; whereby a user of said analog computer can connect desired computing circuits to model and simulate dynamic physical systems whose output responses can be observed on said voltage responsive indicating means.

3. On which an assigned underdamped control system has been modeled; one or more frequency multipliers, a signal power amplifier, a low frequency response speaker to convert low frequency sinusoidal oscillations into sound, a tape playback player having a speaker, and frequency responses of both said speakers being identical, in which said playback player has output responses of known underdamped systems, including said assigned underdamped control system, prerecorded on tape; the output signal of said control system applied to said frequency multipliers, the output signal of said multipliers applied to said power amplifier, and the output signal of said power amplifier applied to first said speaker; the signals from said assigned control system and said tape playback player, on which identical system responses have been prerecorded, being applied simultaneously to said speakers so that a blind person listening and comparing the repeated sounds from said playback player and from said modeled control system can recognize a close agreement between the two said sounds if the system simulated on said analog computer has been programmed correctly.

4. A computer structure in accordance with claim 2, wherein said panel has jack-to-jack connectors mounted on its upper side with their bodies protruding below said panel, and signal wires from said computer modules comprising terminal strips with solderless tie-points and from said potentiometers inserted into said jack-to-jack connectors from the underside of said panel, enabling said computer modules and said potentiometers to be relatively easily removable without unsoldering any connections.

5. A computer structure comprising a cabinet; a panel mounted on said cabinet; a plurality of computing modules on the upper side of said panel; a plurality of signal input and output jacks mounted on said panel external to and associated with each of said computing modules; a plurality of conductive patch cords to connect the output jack of one of said computing modules to the input jack of another of said computing modules; said computing modules each comprising at least one terminal strip having a number of solderless, plug-in quad tie-points to accept active and passive integrated circuit components and to likewise accept discrete computer component connections; each of said computing modules having a cover with a programmer's diagram on the top of said cover; said tie-points within said strips having corresponding holes through said panel permitting the insertion of wires from either side of said panel, so that all input and output signal wires, operational amplifier supply voltage wiring, relay excitation wiring within said cabinet and multiplier integrated circuit wiring are made within or below said computing module cover, thereby eliminating external wiring except for patch cords to jacks adjacent to said cover in order to perform computer functions; said covers may have three or more enclosed sides.

6. A computer structure in accordance with claim 5, wherein each of said covers has downward depending projections along its bottom edges and on opposite sides there of for insertion into slots formed in said panel, said projections being bent outwardly to engage said slots, for supporting said covers, said covers being resilient and capable of being manually compressed to disengage said projections from said slots both for inserting and removing said covers, and wherein each said diagram on top of said cover is capable of being removed and replaced by another to denote a change of circuitry beneath said cover.

7. A computer structure in accordance with claim 5, wherein each of said computing modules consists of a pair of said terminal strips, each having four or more rows of terminals; said strips being rigidly joined together with sufficient spacing between the innermost of said rows of said tie-points to accept standard dual-in-line integrated-circuit packages, wherein each of said terminal strips is of sufficient length to accommodate several of said discrete and integrated-circuit components, and said terminal strips are held together by two or more spacers each of said spacers being provided with a stud for mounting and fastening said pair of strips rigidly onto said panel.

8. A computer structure in accordance with claim 5, wherein said panel has a number of on/off switches and said jacks have bodies protruding below said panel, said computing modules having a potentiometer with signal input and output jacks adjacent to each of said modules; wherein a potentiometer output jack body is connected by an electrical conducting wire to its adjacent computing module input jack body via one of said switches, thus enabling an electrical connection to be made between a potentiometer output jack and its adjacent computing module input jack by turning on a selected one of said on/off switches.

9. A computer structure in accordance with claim 5, wherein said panel has a number of on/off switches and jacks, each jack having a body protruding below said panel; wherein each said computing module has a potentiometer adjacent to itself; and each potentiometer and computing module have input and output jacks associated with themselves; and wherein a potentiometer output jack body is connected to a computing module input jack body three computing modules downstream so that a feedback signal from one computing module output to the input of another module may be applied negatively without a path cord.

10. A computer structure in accordance with claim 2, wherein said computing modules, each having an input terminal clip, include two or more input resistors, the value of each resistor indicating the voltage gain of an input signal, and wherein a means for interconnecting of one computer module to another are patch cords inserted into input and output jacks; wherein said resistors are located external to said computer module, each said resistor being capable of being inserted into two external jacks, with one jack close to said module and a second jack the length of a resistor further away, a common wire linking all said close jacks and said common wire connected to said input terminal clip, thus enabling signals applied to said input resistors to be summed at said terminal clip, and also to be replaced without disturbing said computer module for the purpose of altering the voltage gain of each said input signal.

11. A computer structure in accordance with claim 2, wherein said computer component includes an integrated circuit operational amplifier with a feedback resistor and each said input resistor is encapsulated in a opaque, light-colored plastic sleeve on which a numeral is printed corresponding to the gain of said input signal with reference to said feedback resistor.

12. In combination with a computer structure in accordance with claim 5, a plurality of signal input jacks having bodies mounted on said panel external to and associated with each of said computing modules, and a plurality of isolated resistors, each having a lead wire at each end and said resistors enclosed in an electrically insulated elongated hollow prism, having two ends, provided with jacks at one end, each said jack's body end making electrical contact to a lead wire at one end of said resistor, said second jacks for insertion of patch cord plugs, and pins at other end of said prism, each pin making electrical contact with a lead wire at the other end of a resistor, spaced for insertion into said input jacks, to enable several signals, introduced via patch cords, to be applied to the input of a computing module via said resistors.

13. A computer structure in accordance with claim 5 wherein some of said computer modules perform analog integration and wherein said analog integration modules include reset mode, hold mode, and compute mode subminiature relays, input and shunt resistors, and feedback capacitors; and a 3-way rocker switch with positions of a first momentary "on", and "off", and a second momentary "on", said first momentary "on" position energizes all of said reset mode relays, said "off" position deenergizes all said reset mode relays, and said second momentary "on" position energizes all of said compute mode relays; said reset mode enables each of said integration modules to be set to its initial value before starting computation by placing said feedback capacitors and said shunt resistors in a loop allowing said shunt resistor discharge said capacitors to their initial value condition; and in the computer mode, said compute relays are energized and said reset relays are deenergized allowing an applied voltage to said input resistors to appear at said integration modules' output; and said relays are deenergized in the hold mode.

14. A computer structure in accordance with claim 5, wherein said panel has a number of on/off switches and jacks, each jack having a body with an insert designed to hold and maintain both a gripping power and low contact electrical resistance on an inserted solid conductor mounted therein; a computing module output jack body is connected to an input jack body of an adjacent computing module by way of one of said switches enabling electrical connections between two of said jacks to be made by a selected on/off switch and without the need of a patch cord between said jacks, in order to simplify the implementation of computer programs of mathematical relationships.

15. A computer structure in accordance with claim 13, wherein each of said integration modules includes a single-pole-single-throw switch and a feedback resistor of the desired size connected to enable replacing one of said feedback capacitors; each of said integration modules may perform as a summation module merely by flipping said switch to replace said capacitor with said resistor.

16. A computer structure in accordance with claim 5 wherein each said jack is a jack-to-jack connector consisting of a cylindrical body flanged at one end and having a captive resilient insert extending throughout length of said body, made of springy conductive material, formed with two or more narrowing portions to hold a solid wire inserted at either end of said body, in order that different jacks may be electrically connected together from the under side of said panel without the use of solder.

* * * * *

UNITED STATES PATENT AND TRADEMARK OFFICE
CERTIFICATE OF CORRECTION

PATENT NO. : 3,996,457

DATED : Dec. 7, 1976

INVENTOR(S) : Edwin Z. Gabriel

It is certified that error appears in the above–identified patent and that said Letters Patent are hereby corrected as shown below:

Sheet 1 of Drawings, FIG. 1, top three computing modules, A, A, M, prime each input terminal designation 1, 2, 3.

Sheet 6, FIG. 13, FET-OP AMP INTEGRATED CIRCUITS, underline each numbered terminal 2,3,6. also for MULTIPLIER, underline each numbered terminal 1,6,4.

Sheet 13, FIG. 32B, identify output of multiplier 157 by the symbol "$e^*(t)$".

Column 10, line 62, delete "operation" and substitute -- operational --.

Column 24, claim 3, delete "On" and substitute --In combination with a computer structure in accordance with claim 2, on --.

Column 23, claim 2, lines 44, 45, delete "external to and associated with each computing module with circuit components".

line 42, after "components" add --,to form summing amplifier and integration computing circuits,--.

line 47, after "panel" insert --external to and associated with each computing module, --.

UNITED STATES PATENT AND TRADEMARK OFFICE

CERTIFICATE OF CORRECTION

PATENT NO. : 3,996,457

DATED : Dec. 7, 1976

INVENTOR(S) : Edwin Z. Gabriel

It is certified that error appears in the above-identified patent and that said Letters Patent are hereby corrected as shown below:

Column 23, claim 2, line 55, after "responsive" insert --indicating--.

line 58, after "converting" insert --said--.

line 59, after "into" insert --said--.

Signed and Sealed this

Twenty-sixth Day of April 1977

[SEAL]

*Attest:*

RUTH C. MASON
*Attesting Officer*

C. MARSHALL DANN
*Commissioner of Patents and Trademarks*